United States Patent
Klebba et al.

[11] Patent Number: 6,016,287
[45] Date of Patent: Jan. 18, 2000

[54] APPARATUS AND METHOD FOR ACCURATELY DETERMINING THE LOCATION OF EVENTS SUCH AS PEAKS IN SEISMIC DATA

[75] Inventors: Eric F. Klebba, Pearland; Peter P. Van Bemmel, Houston, both of Tex.

[73] Assignee: GeoQuest, a division of Schlumberger Technology Corporation, Houston, Tex.

[21] Appl. No.: 09/136,599

[22] Filed: Aug. 19, 1998

Related U.S. Application Data

[60] Provisional application No. 60/084,587, May 7, 1998.

[51] Int. Cl.[7] .................................................. G01V 1/30
[52] U.S. Cl. .............................. 367/72; 367/38; 367/73
[58] Field of Search ................................ 367/47, 38, 73, 367/72

[56] References Cited

U.S. PATENT DOCUMENTS

| | | |
|---|---|---|
| 4,727,488 | 2/1988 | Flinchbaugh .............................. 369/38 |
| 5,056,066 | 10/1991 | Howard ..................................... 367/72 |
| 5,153,858 | 10/1992 | Hildebrand . | 
| 5,251,184 | 10/1993 | Hildebrand et al. . |
| 5,432,751 | 7/1995 | Hildebrand .............................. 367/72 |
| 5,537,365 | 7/1996 | Sitoh ........................................ 367/73 |
| 5,570,106 | 10/1996 | Viswanathan . |

OTHER PUBLICATIONS

Numerical Methods for Scientists and Engineers, Second Edition, R.W. Hamming, 1962, 1973.
Numerical Analysis, Mathematics of Scientific Computing, David Kincaid and Ward Cheney, 1996.
Numerical Recipes in C, the Art of Scientific Computing, by William H. Press, and Saul A. Teukolsky, William T. Vetterling, and Brian P. Flannery 1988 to 1995.

*Primary Examiner*—Christine K. Oda
*Assistant Examiner*—Anthony Jolly
*Attorney, Agent, or Firm*—John H Bouchard

[57] ABSTRACT

An operator sitting at a workstation views, on a display, a multitude of seismic traces having one or more horizons indicated therein by a plurality of sets of events (such as peaks or troughs or zero crossings) on the seismic traces. The operator uses a mouse to draw a line from left to right across a plurality of seismic traces being displayed on the workstation display screen. At this point, the line does not lie on the events (such as the peaks) of the seismic traces. Therefore, the line does not yet represent a horizon in an earth formation. The operator presses a key on the keyboard of the workstation. In response to the pressing of this key, the workstation processor executes a "snapper software" in accordance with the present invention. When the snapper software of the present invention is executed, the line, previously drawn by the operator across the seismic traces on the workstation display screen, moves from one location, not corresponding to the events (such as the peaks) of the seismic traces, to another location, corresponding to the events (such as the peaks) of the seismic traces. When the line moves to said another location on the screen display, the line now lies directly on a set of events (such as peaks) of the seismic traces which underlie the line. Now, the line does accurately represent a horizon in an earth formation. The snapper software of this invention can determine the peaks, the troughs, and the zero crossings of the seismic traces. As a result, the horizon depicted by the snapped line on the workstation screen display is accurately represented.

24 Claims, 20 Drawing Sheets

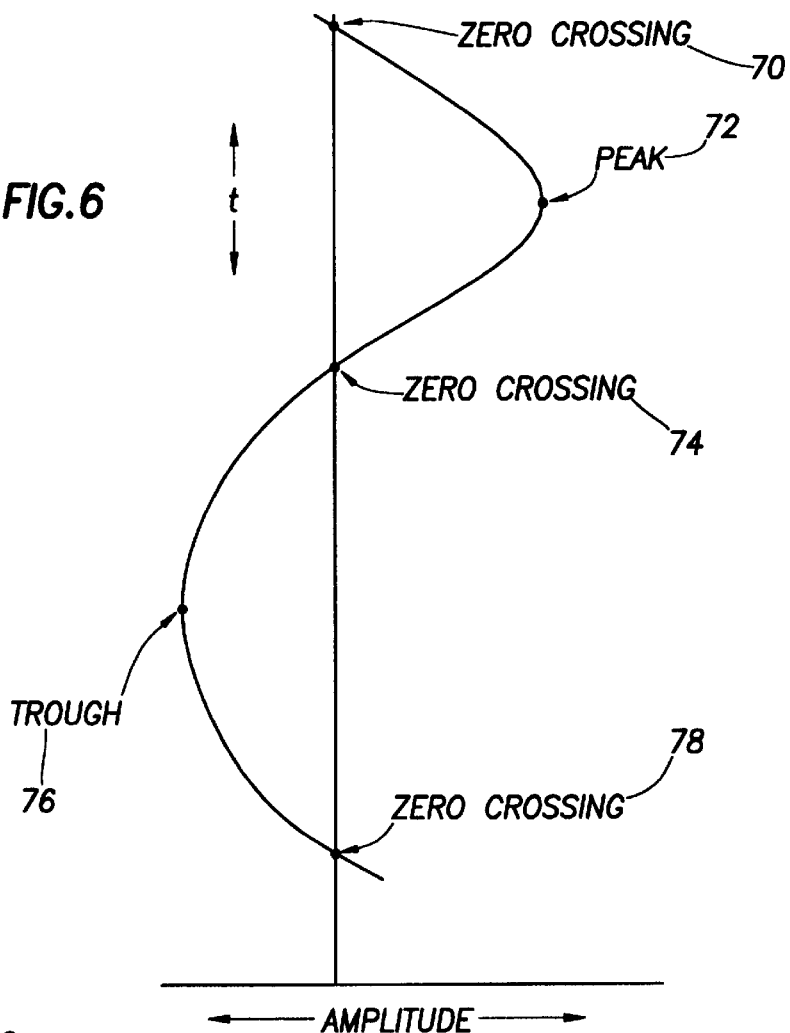
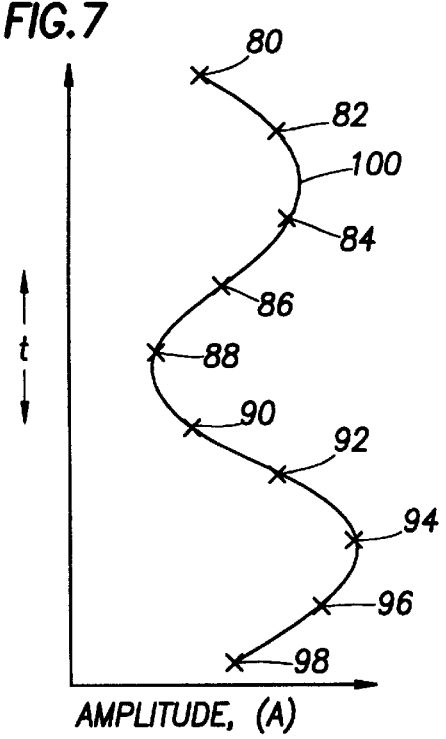
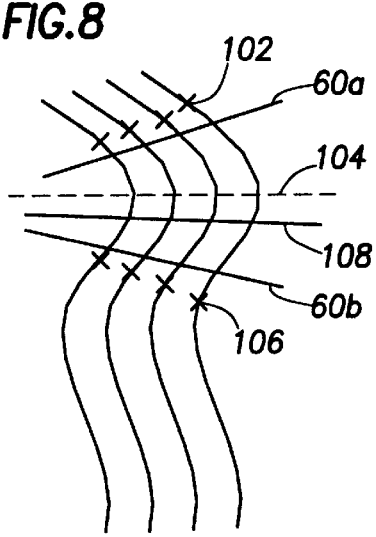

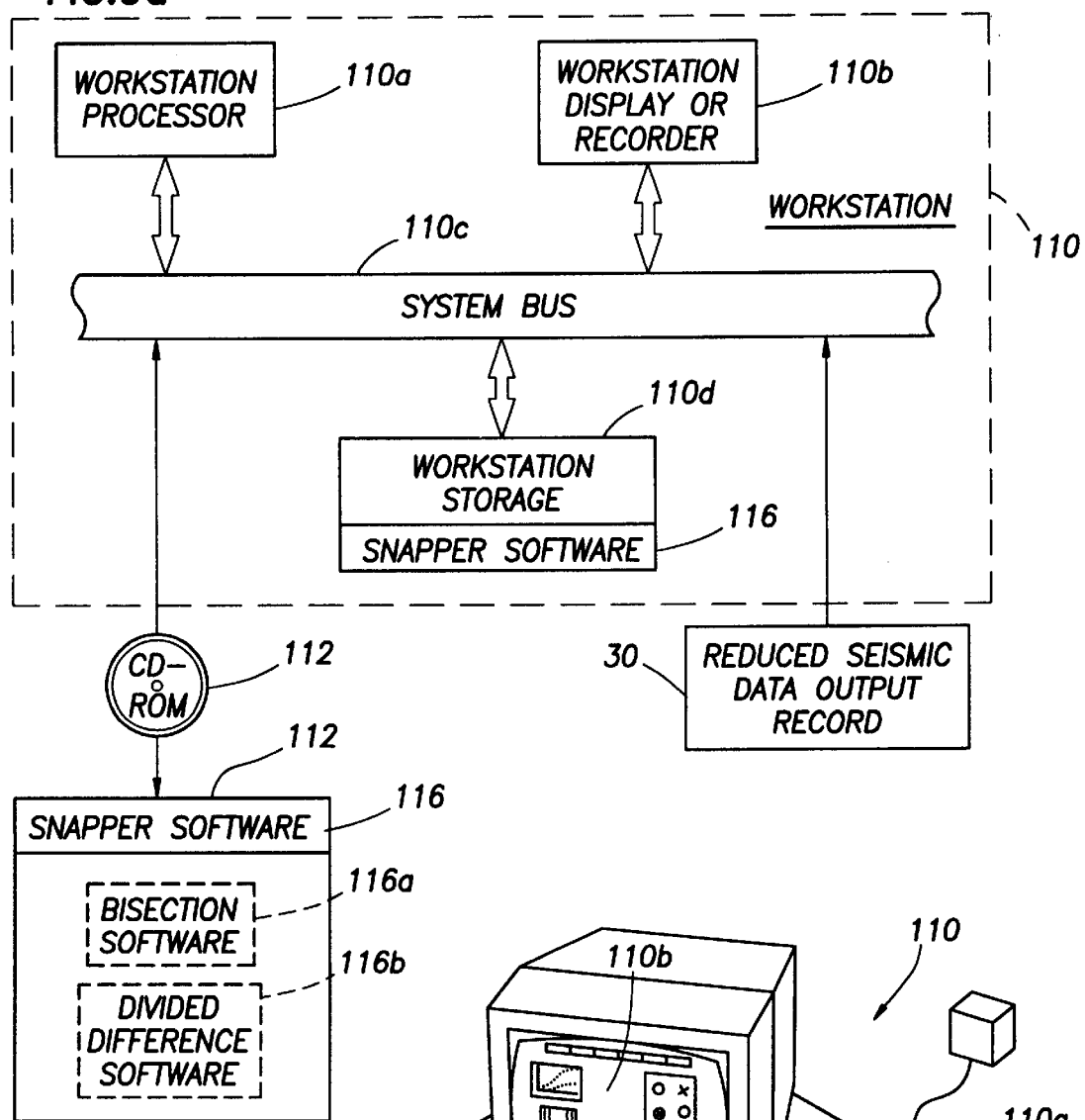
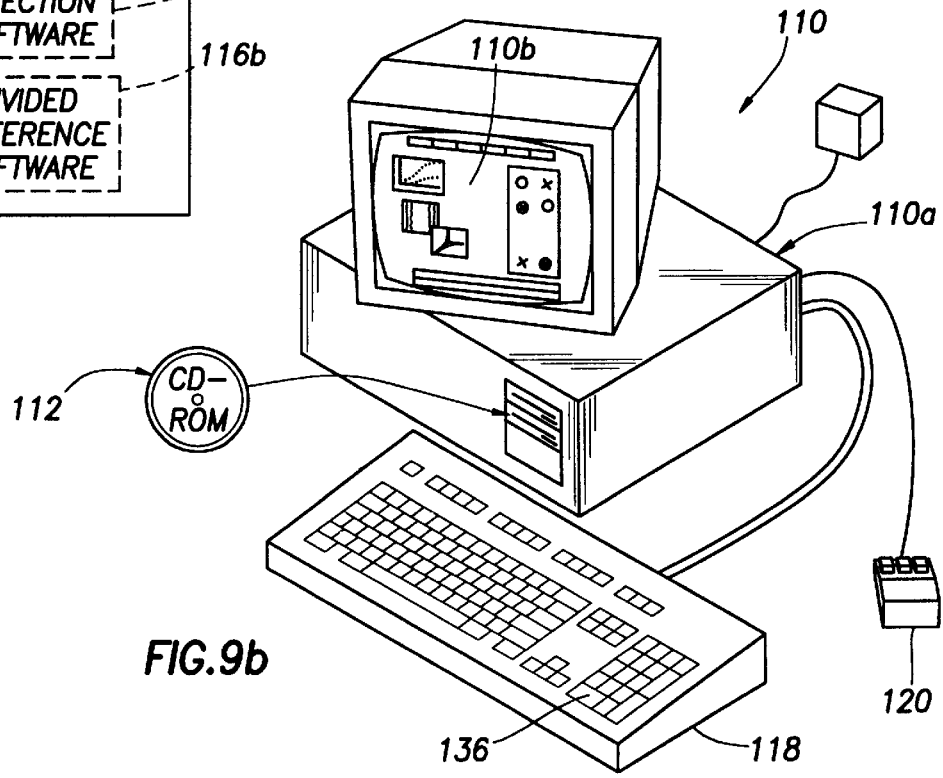

FIG. 10
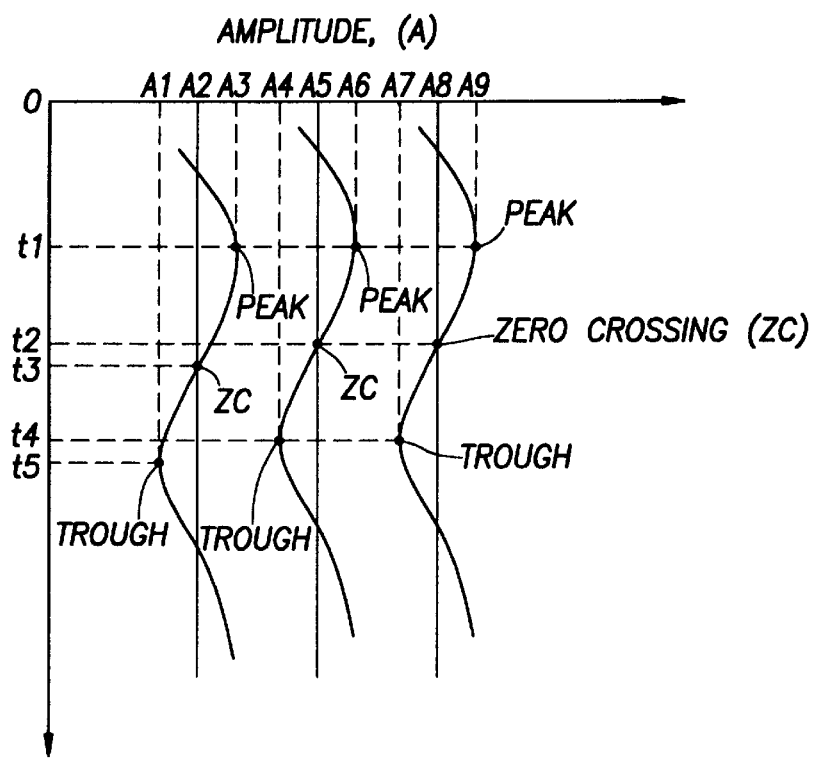
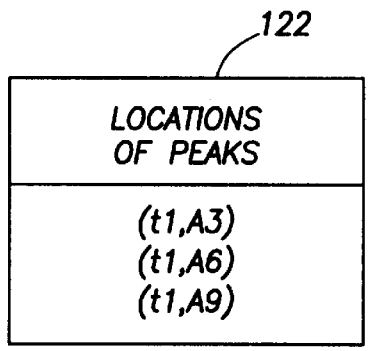
FIG. 11
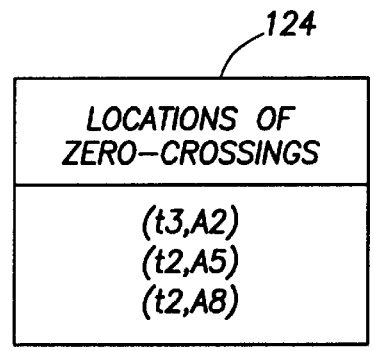
FIG. 12
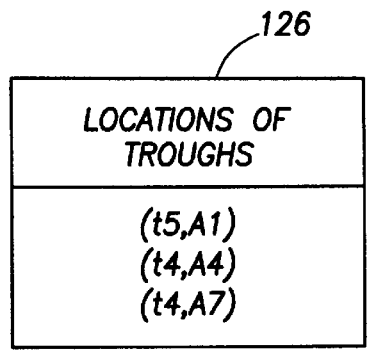
FIG. 13

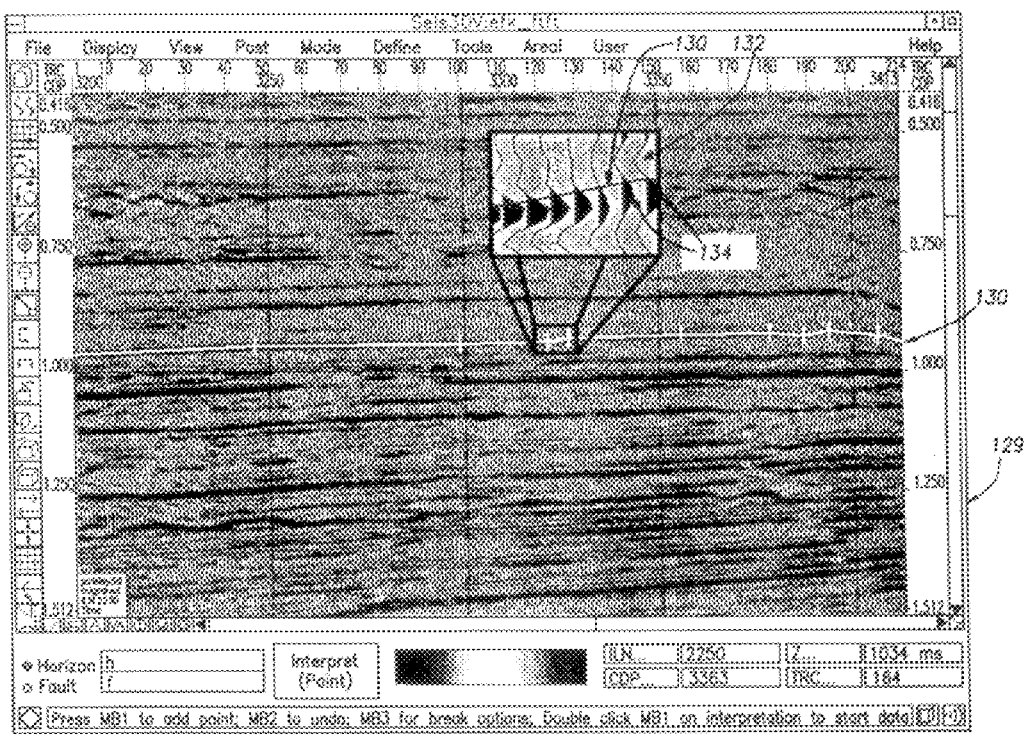

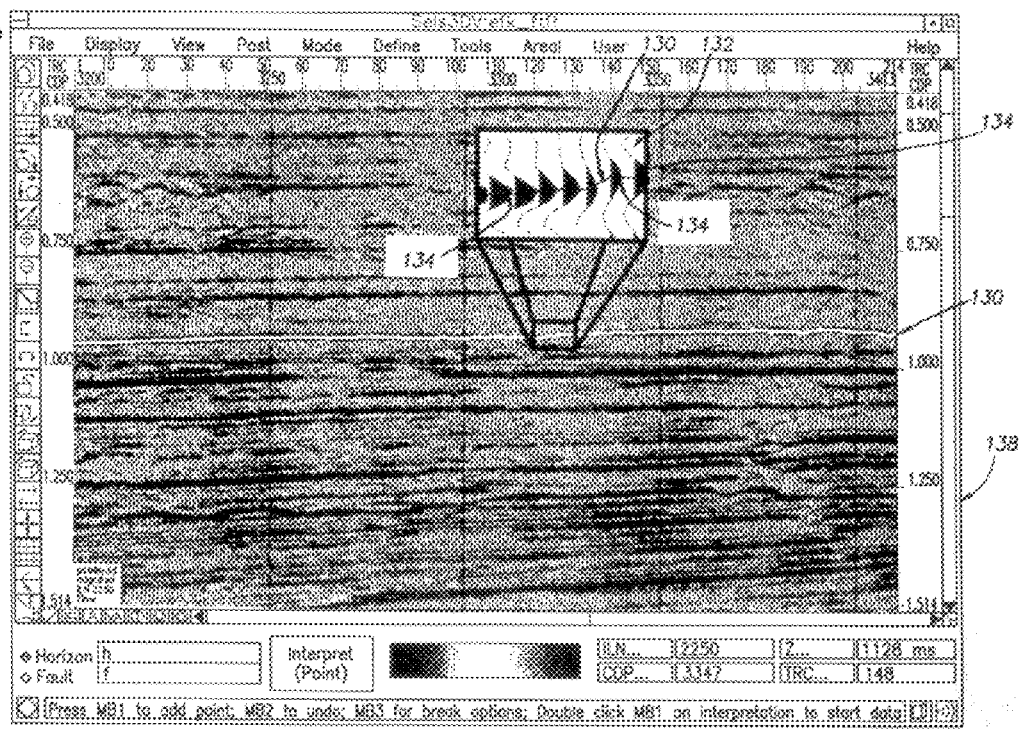

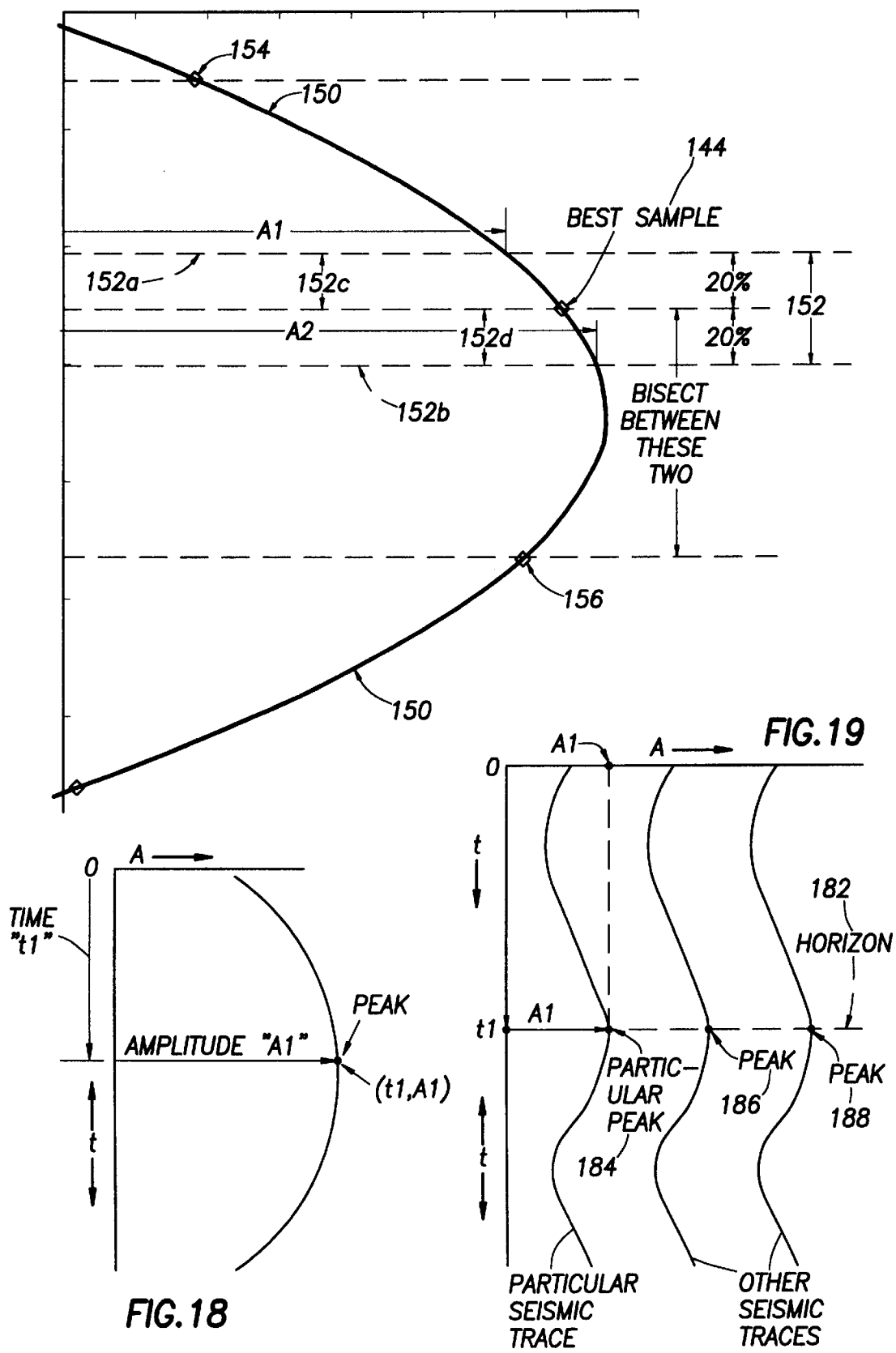

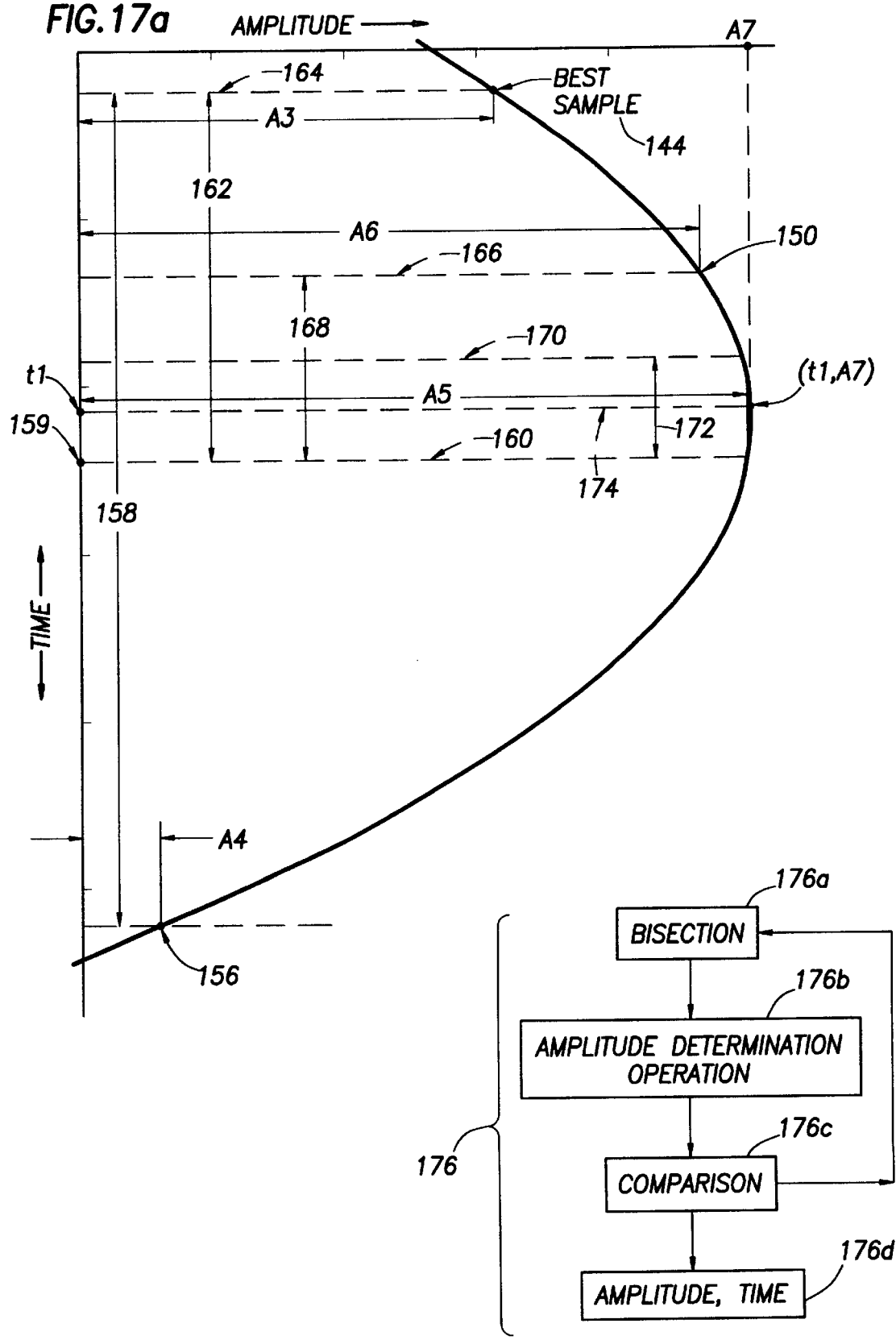

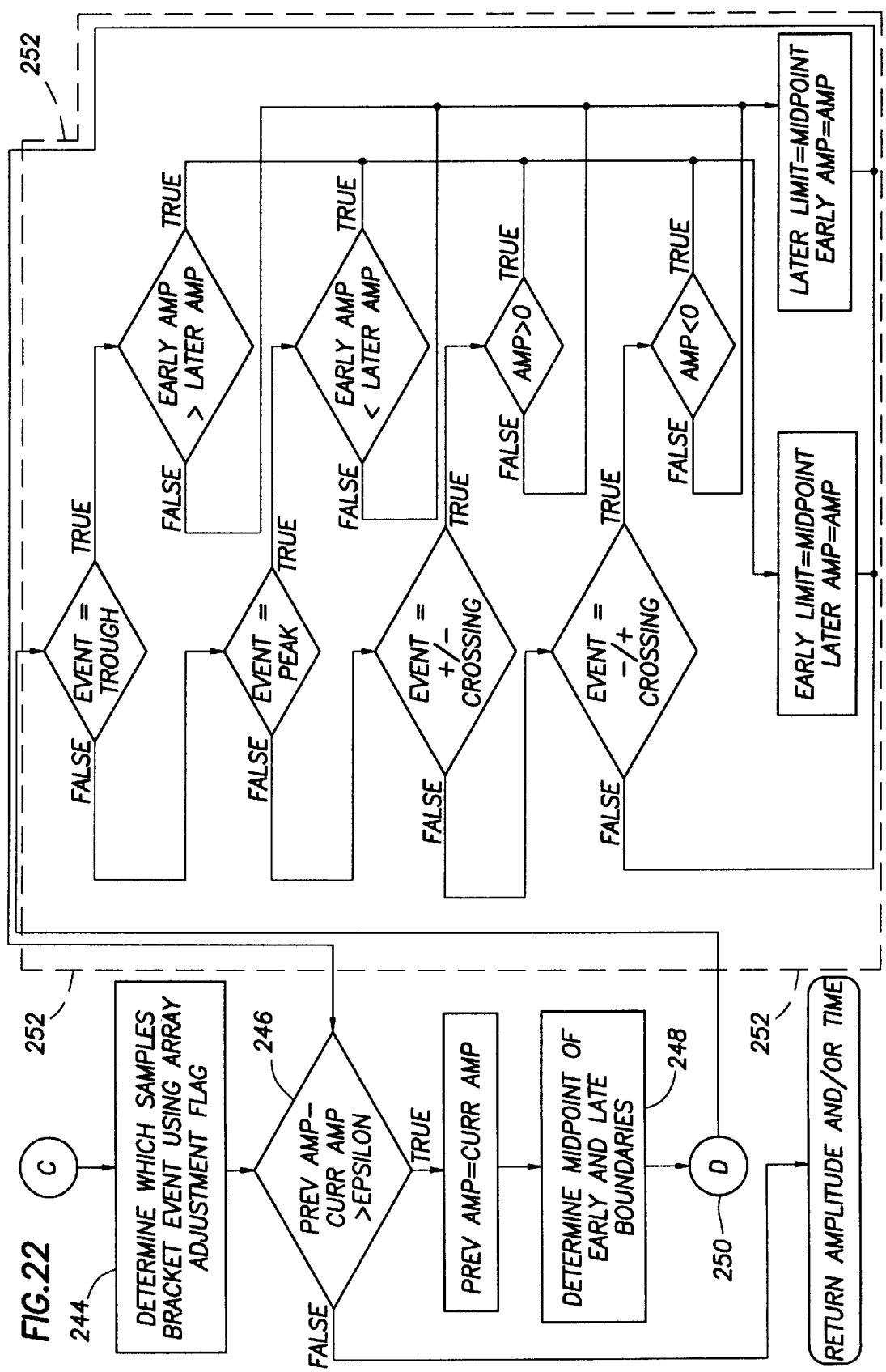

APPARATUS AND METHOD FOR ACCURATELY DETERMINING THE LOCATION OF EVENTS SUCH AS PEAKS IN SEISMIC DATA

This application claims benefit of provisional U.S. Ser. No. 60/084,587.

BACKGROUND OF THE INVENTION

The subject matter of the present invention relates to an apparatus and method for analysis of received seismic data for the purpose of reducing bias in said seismic data and to accurately determine the location of events, such as peaks and troughs and zero cross crossings, in each of the plurality of seismic traces which comprise the seismic data.

Petroleum exploration professionals are required to have a detailed understanding of subsurface geology and the geometry of subsurface structures. Particularly, it is important for petroleum exploration professionals to accurately locate a horizon or interface in the subsurface geological structure. Received seismic data is analyzed for the purpose of locating the horizon or the interface in the subsurface geological structure.

Seismic data is displayed using a plot of common attributes, such as amplitudes of seismic reflections from subsurface structures (i.e., horizons). For example, a plot of amplitudes of seismic reflection data as a function of time or depth would constitute one seismic trace, and a multitude of such seismic traces lying in a first plane would represent one surface of a 3D cube in an earth formation (see FIG. 5). In addition, a multitude of such seismic traces lying in a plurality of other additional planes disposed adjacent to the first plane would represent the entire 3D cube in the earth formation. In the first plane, if a line were drawn (on a workstation display by an operator sitting at a workstation) transversely across the plane starting at a location which would correspond to a horizon, that line could represent an edge of a horizon provided, however, that the line falls accurately on the events (such as the "peaks") of each of the seismic traces which lie on or near that line in the first plane. However, if that line does not fall on the event (such as the "peaks") of each of the seismic traces which lie on or near that line in the first plane, that line would not accurately represent an edge of the horizon. Furthermore, if other additional lines were drawn transversely across the other additional planes starting at locations which would correspond to a horizon, those other additional lines would collectively define the horizon itself provided, however, that the other additional lines fall accurately on the events (such as the "peaks") of the seismic traces which lie on or near the other additional lines in those other additional planes. However, if the other additional lines do not fall accurately on the events (i.e. the peaks) of the seismic traces which lie on or near the other additional lines in the other additional planes, the horizon itself cannot be accurately defined or represented. This process, practiced by the operator at the workstation, of drawing lines across a plane which contains a plurality of seismic traces starting at a location which would correspond to a horizon is known as "picking" and the process of disposing that line on the events (such as the peaks or the troughs or the zero crossings) of the seismic traces which fall on or near that line is called "snapping". Thus, the term "snapping to the peak" refers to first drawing a line across a plane containing a plurality of seismic traces (starting at a location which would correspond to a horizon) and then pressing a key on a computer keyboard which will move or "snap" that line onto the events (such as the peaks or the troughs or the zero crossings) of the seismic traces which lie on or near that line on the plane. The aforementioned "snapping to the peak" concept will be better understood in the following discussion with reference to FIGS. 14a and 14b.

Therefore, in order to accurately define each horizon in an earth formation, it is very important that the location of each of the events, such as the peaks and troughs and zero crossings, of each of the seismic traces (lying in each of the planes of a 3D cubic volume of an earth formation) be accurately determined. The location of an "event" (such as a peak or trough or zero crossing) is defined by its input time and its amplitude at that input time.

However, prior art techniques which involve "snapping to the peak" were biased in favor of the individual samples of input seismic data. That is, when a line is drawn across a plane of the 3D cubic volume, and when the key on the keyboard was pressed to "snap" that line onto an event, such as the peaks, of the seismic traces which lie on or near that line in the plane, the prior art "snapping" technique (which is adapted for determining the location of the events in the seismic traces) would determine that the events, such as the peaks, were located near an adjacent sample; that is, the location of the events were "biased" by the prior art "snapping technique" toward the nearest, adjacent seismic samples (see FIG. 8), thereby creating a "biasing error". This "biasing error" means that the line drawn across the plane of seismic traces, by a workstation operator, would not accurately fall on the edge of a horizon in the 3D cubic volume of earth formation. In three dimensional terms, this "biasing error", created by the prior art "snapping technique", means that the horizon itself would not be accurately defined. As noted earlier, petroleum exploration professionals must know the accurate location of each horizon in an earth formation in order to further know the location of underground deposits of hydrocarbons in the earth formation for subsequent drilling purposes.

Recent disclosures which have made an effort to solve the horizon "picking" problems are, for example: U.S. Pat. No. 5,056,066 to Howard entitled "A method for attribute tracking in seismic data"; U.S. Pat. No. 5,570,106 to Viswanathan entitled "Method and Apparatus for creating horizons from numerical 3-D seismic data"; U.S. Pat. No. 5,537,365 to Sitoh entitled "Apparatus and Method for evaluation of picking horizons in 3D seismic data"; U.S. Pat. No. 5,251,184 to Hildebrand et al entitled "Method and Apparatus for finding horizons in 3D seismic data"; and U.S. Pat. No. 5,153,858 to Hildebrand entitled "Method for finding horizons in 3D seismic data".

SUMMARY OF THE INVENTION

Accordingly, it is a primary object of the present invention to accurately determine the locations, in terms of time and amplitude, of each of the events, such as peaks and troughs and zero crossings, in each seismic trace of a plurality of seismic traces in order that a subsurface geologic interface, such as a horizon, can be accurately defined and mapped.

Therefore, in accordance with this and other objects of the present invention, it is a primary aspect of the present invention to accurately determine the locations of each of the events, such as peaks and troughs and zero crossings, of each of the seismic traces obtained in response to a seismic operation performed over an earth formation by performing the following steps in connection with a particular event (such as a peak) on a particular seismic trace: (a) picking an input time along a seismic trace which is located near the particular event, (b) setting up a search window around the selected input time, (c) locating a "best sample" within the search window which appears to represent the event (such as a peak), the "best sample" being a sample of the seismic trace which lies within the search window and which appears to represent the event (such as a peak), (d) setting up arrays to store the locations of other samples which lie on the seismic trace and are disposed around both sides of the "best sample", (e) using the samples stored in the arrays to plot a curve which overlays the samples stored in the arrays, and (f) using the curve, determining a time and amplitude associated with the particular event, such as a peak.

It is a further aspect of the present invention to accurately determine the locations of each of the events, such as the peaks or troughs or zero crossings, of each of the seismic traces obtained in response to a seismic operation performed over an earth formation, wherein the step (f), for determining the time and amplitude associated with the particular event, such as a peak, in response to the curve plotted during the plotting step (e), further comprises the steps of: (F1) locating the best sample on the curve, (F2) setting up another second window (hereinafter called "the second window") bounded on both sides of the "best sample" on the curve, where the second window has a "first side" and a "second side", the width of that portion of the second window between the "best sample" on the curve and the "first side" being equal to 20% of the distance between the best sample and the next adjacent sample on one side of the best sample on the curve (i.e., 20% of the sample rate), the width of that portion of the second window between the "best sample" on the curve and the "second side" being equal to 20% of the distance between the best sample and the next adjacent sample on the other side of the best sample on the curve (i.e., 20% of the sample rate), (f3) using a Divided Difference software (of FIG. 23) to determine the amplitude A1 of the curve at the "first side", (f4) using a Divided Difference software (of FIG. 23) to determine the amplitude A2 of the curve at the "second side", (f5) determining if A2>A1 or if A1>A2, (f6) performing a Bisection operation (and a Divided Difference operation at the midpoint lines) between the "best sample" on the curve and "a second adjacent sample" located adjacent the "second side" of the second window when A2>A1; or performing a Bisection operation (and Divided Difference operation at the midpoint lines) between the "best sample" on the curve and "a first adjacent sample" located adjacent the "first side" of the second window when A1>A2. The Bisection and Divided Difference operation can be found in a book called "Numerical Analysis" by David Kincaid and Cheney Ward, 1996, Mathematics of Scientific Computing $2^{nd}$ Edition, Brooks/Cole Publishing, pages 80–84, 350–356, the disclosure of which is incorporated by reference into the specification of this application.

It is a further aspect of the present invention to accurately determine the locations of each of the events, such as the peaks and troughs and zero crossings, of each of the seismic traces obtained in response to a seismic operation performed over an earth formation, wherein the performing step (f6), for performing a Bisection operation, and a Divided Difference operation at the midpoint lines, between the "best sample" on the curve and "an adjacent sample" (i.e., either the "first adjacent sample" or the "second adjacent sample"), comprises the steps of: (f61) bisecting or subdividing, in half, the width between the "best sample" and the "adjacent sample" thereby producing a "first midpoint line" which lies midway between the "best sample" and the "adjacent sample"; determining a known amplitude of the curve at the "best sample" and a known amplitude of the curve at the "adjacent sample" (recall that the amplitudes of all the seismic samples are already known); and comparing the known amplitude of the curve at the "best sample" with the known amplitude of the curve at the "adjacent sample", and (f62) when determining a "peak" type of event, when the known amplitude of the curve at the "best sample" is greater than the known amplitude of the curve at the "adjacent sample", bisecting or subdividing, in half, the width of another window extending between the "first midpoint line" and the "best sample" thereby producing a "second midpoint line" which lies midway between the "first midpoint line" and the "best sample", performing a Divided Difference operation (FIG. 23) for determining the amplitude of the curve at the "first midpoint line" and recalling the known amplitude of the curve at the "best sample", and comparing the calculated amplitude of the curve at the "first midpoint line" with the known amplitude of the curve at the "best sample", and (f63) continuing the bisecting step (for bisecting or subdividing a width to determine a midpoint line) and the determining/performing step (for determining the amplitude of the curve on both sides of the midpoint line) and the comparing step (for comparing such amplitudes) until the amplitude of the curve at the last midpoint line, the "nth midpoint line", and the amplitude of the curve at the previous midpoint line, "(n−1)th midpoint line", differs by only a very small tolerance value (epsilon), and (f64) when the difference between the amplitude of the curve at the last midpoint line, the "nth midpoint line", and the amplitude of the curve at the previous midpoint line, the "(n−1)th midpoint line", is within the tolerance value (epsilon), the location of the "particular event", such as a particular peak, on the "particular seismic trace" corresponds to the time and amplitude of the last midpoint line, that is, the the "nth midpoint line".

In accordance with the object and other aspects of the present invention, an operator sitting at a workstation views, on a display, a multitude of seismic traces having one or more horizons indicated therein by a plurality of sets of events, such as peaks, on the seismic traces. The operator uses a mouse to draw a line across the screen display containing the multitude of seismic traces. At this point, the line does not lie on the events (such as the peaks) of the seismic traces. Therefore, the line does not yet represent a horizon in an earth formation. The operator presses a key on the keyboard of the workstation. In response to the pressing of this key, the workstation processor executes a "snapper software" in accordance with the present invention. When the snapper software is executed, the line, previously drawn across the screen display by the workstation operator, moves from one location near the events (such as the peaks) to another location nearly on top of the events (such as the peaks). When the line moves to said another location on the screen display, the line now lies directly on top of a set of events, such as peaks, of the seismic traces which underlie the line. Now, at this point, the line drawn across the display screen of the workstation does, in fact, accurately represent a horizon in an earth formation. This function is clearly shown in FIGS. 14a and 14b of the drawings. The snapper software of the present invention functions in the manner described in the above paragraphs with reference to the different aspects of the present invention. The snapper software of this invention can determine the peaks and the troughs and the zero crossings of each of the seismic traces. As a result, the horizon depicted by the snapped line on the workstation screen display is accurately represented.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 6 illustrates a seismic trace including its zero crossing, its peak, and its trough;

FIG. 7 illustrates how a plurality of seismic samples can be interconnected together by a curve to form the seismic trace;

FIG. 8 illustrates how, in the prior art snapper technology, the peak type of event of a seismic trace was predicted by said prior art snapper technology to be biased toward the individual seismic samples, which biasing can produce inaccurate results;

FIGS. 9a and 9b illustrate a computer workstation which receives a storage medium, such as a CD-Rom, that stores therein the snapper software of the present invention, the snapper software being loaded from the CD-Rom into a workstation storage memory;

FIGS. 10 through 13 illustrate the novel results produced when the snapper software is executed by the workstation processor of FIG. 9a, those results accurately recording the actual locations (in terms of time and amplitude) of the peaks, troughs and zero crossings of each of the plurality of seismic traces of FIGS. 4 and 5;

FIGS. 14a through 14c illustrate the displays which are presented to an operator sitting at the workstation of FIGS. 9a and 9b prior to and after execution, by the workstation processor, of the snapper software of the present invention (which accurately produces and records the actual locations of the events, such as the peaks, troughs, and zero crossings, of each of the plurality of seismic traces of FIGS. 4 and 5), one display illustrating a picked horizon line prior to "snapping to the peak", another display illustrating the picked horizon line after "snapping to the peak", and another display illustrating a top view of the picked horizon line (the actual horizon) after "snapping to the peak";

FIGS. 16a through 19 illustrate, from a conceptual point of view, the function performed when the snapper software of the present invention is executed by the workstation processor of FIG. 9a;

FIG. 22 illustrates the "perform bisection" portion of the flowchart of FIG. 15 (i.e., the bisection software)

DETAILED DESCRIPTION OF THE PREFERRED EMBODIMENT

Figure 1:
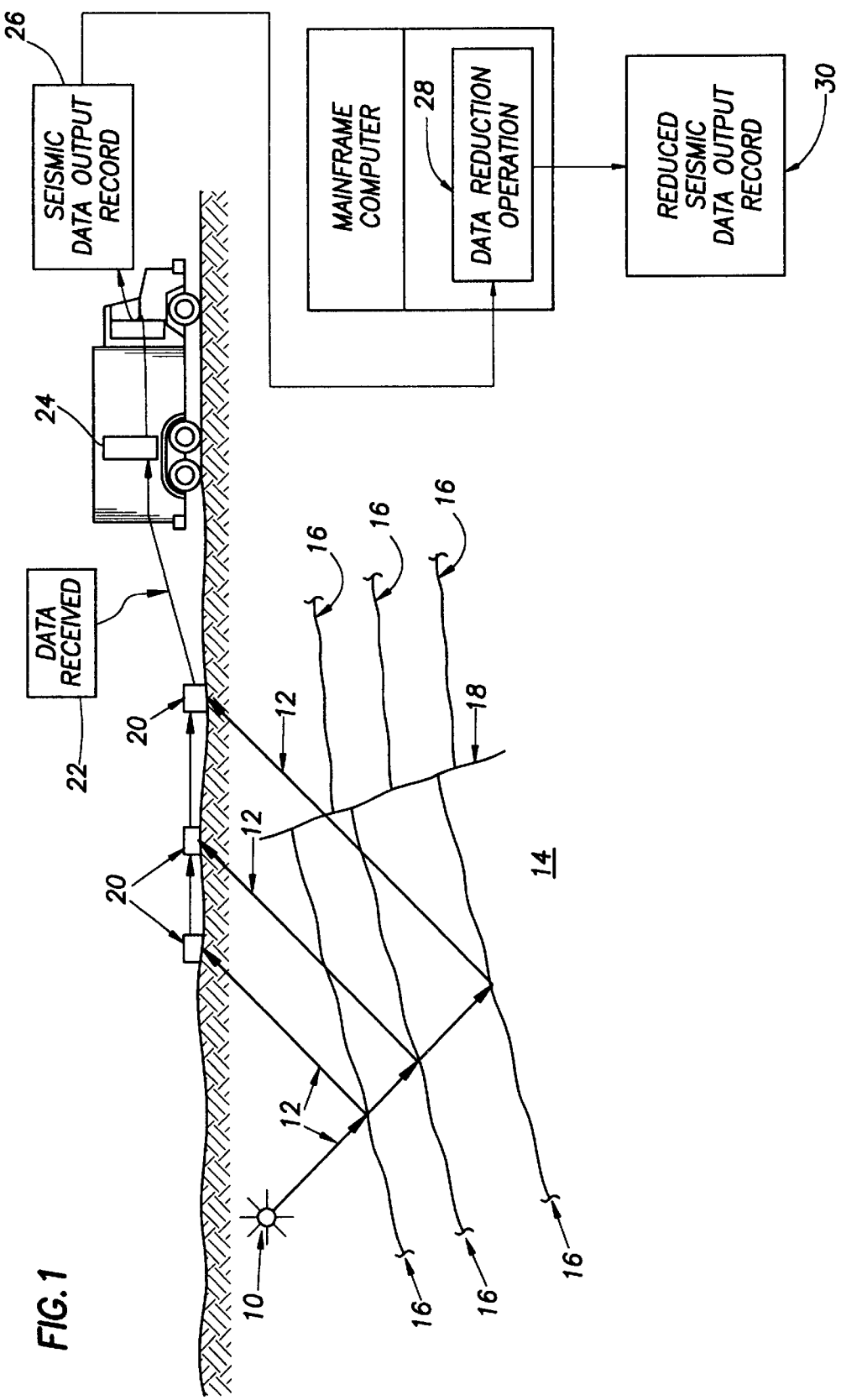
FIGS. 1 and 2 illustrate acoustic or sound vibrations reflecting off horizons in an earth formation and the generation of a reduced seismic data output record containing a plurality of seismic traces which are provided as input data to a workstation.
Figure 2:
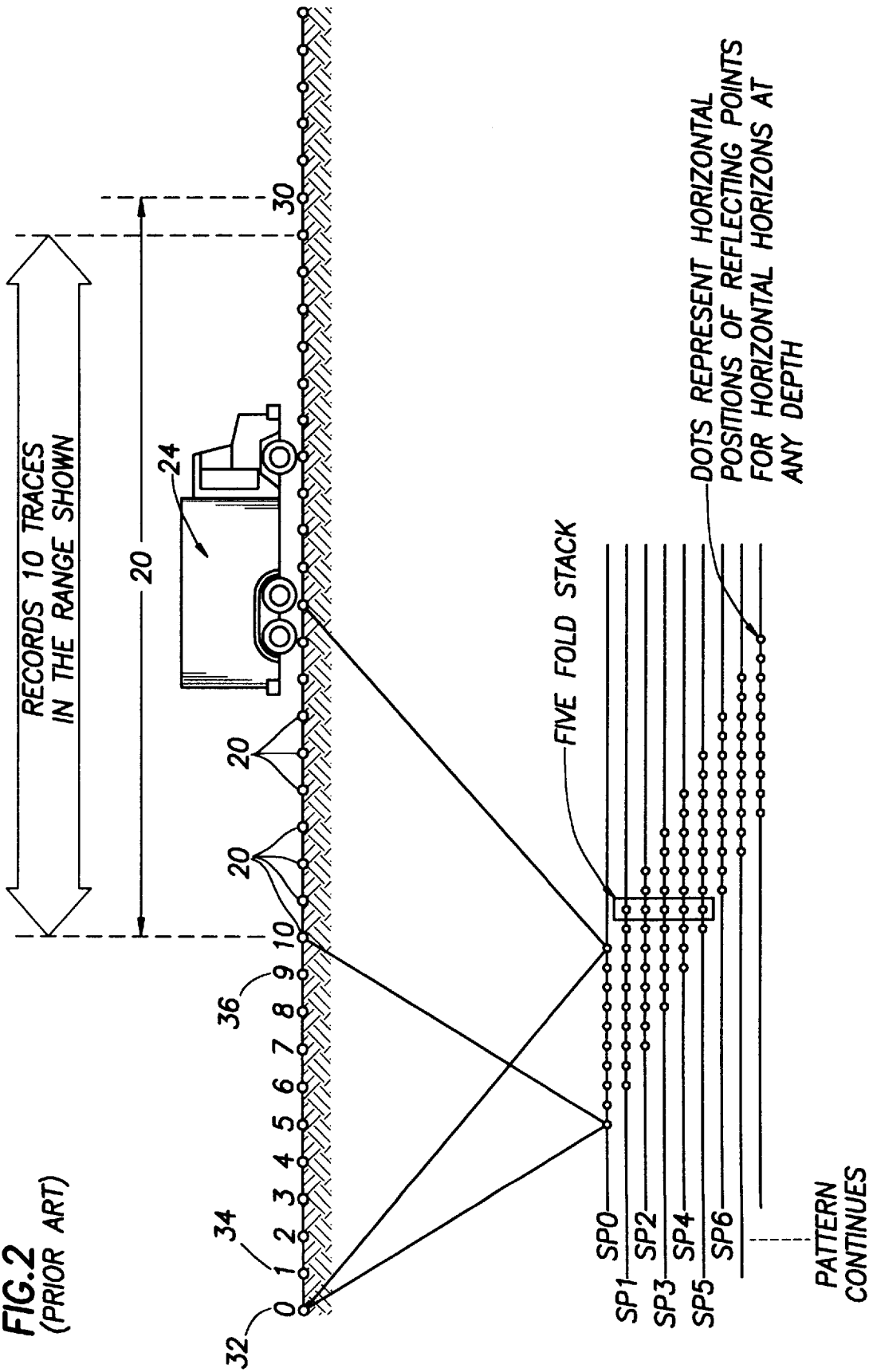

Referring to FIGS. 1 and 2, referring initially to FIG. 1, a typical "seismic survey operation" is illustrated. In FIG. 1, an acoustic source of sound vibrations 10 generates a sound vibration 12 which propagates into an earth formation 14. The sound vibrations 12 reflect off a plurality of horizons 16 in the formation 14. The horizons 16 are separated by a fault 18 in the formation which traverses a section of the earth formation 14. The sound vibrations 12 reflect off the horizons 16 and propagate upwardly to the earth's surface, and a plurality of geophones 20 receive the sound vibrations 12. As a result, electrical signals are generated by each of the geophones 20 representing the sound vibrations 12 which are received by the geophones 20, and those electrical signals contain digital data representing a plurality of seismic traces (not data reduced) which will hereinafter be called "data received" 22. The data received 22 is stored in a recording truck computer 24, the data received 22 being subsequently recorded by the recording truck computer on an output record hereinafter called a "seismic data output record" 26. The seismic data output record 26 is subsequently received by a mainframe computer where it undergoes a data reduction operation 28. The data reduction operation 28 is fully discussed in prior pending U.S. application Ser. No. 08/796,233 filed Feb. 6, 1997 entitled "method and apparatus for automatically identifying fault cuts in seismic data using a horizon time structure", the disclosure of which is incorporated by reference into this specification. In addition, the data reduction operation 28 is also discussed in a book entitled "Seismic Velocity Analysis and the Convolutional Model" by Enders A Robinson, the disclosure of which is also incorporated by reference into this specification. When the data reduction operation 28 is complete, a reduced seismic data output record 30 is generated by the mainframe computer. The reduced seismic data output record 30 contains a plurality of seismic traces (data reduced) which are illustrated in FIG. 3.

In FIG. 2, the method and apparatus shown in FIG. 1 actually performs a "3D seismic operation". FIG. 2 was also taken from the book entitled "Seismic Velocity Analysis and the Convolutional Model", by Enders A. Robinson, the disclosure of which has already been incorporated by reference into this specification. The seismic operation of FIG. 1 is performed 10 different times. For example, when the explosive energy source 10 is located at position 32 (the first position or position "0" along the surface of the earth) in FIG. 2, a first plurality of electrical signals from the geophones 20 are stored in the computer 24 in the recording truck. The explosive energy source is moved to position 34 in FIG. 2. When the explosive energy source 10 is located in position 34 (the second position or position "1" along the surface of the earth), a second plurality of electrical signals are stored in the computer 24 in the recording truck. The explosive energy source 10 is repeatedly and sequentially moved from positions "2" to "9" in FIG. 2 until it is located at position 36 (i.e.—position "9" which is the tenth position) on the surface of the earth; during that movement of the energy source 10 from positions 2 through 9, a third plurality of electrical signals through a tenth plurality of electrical signals are stored in the computer 24 of the recording truck. As a result, in FIG. 2, the computer 24 in the recording truck records therein ten (10) sets of electrical signals, where each set includes a plurality of electrical signals, between position 32 and position 36 along the surface of the earth. The seismic data output record 26 of FIG. 1 will be generated by the computer 24 in the recording truck, the seismic data output record 26 including the ten (10) sets (or ten "traces") of electrical signals received from the geophones 20. When the seismic data output record 26 is "data reduced" via the data reduction operation 28 in FIG. 1, the reduced seismic data output record 30 is generated.

Figure 3:
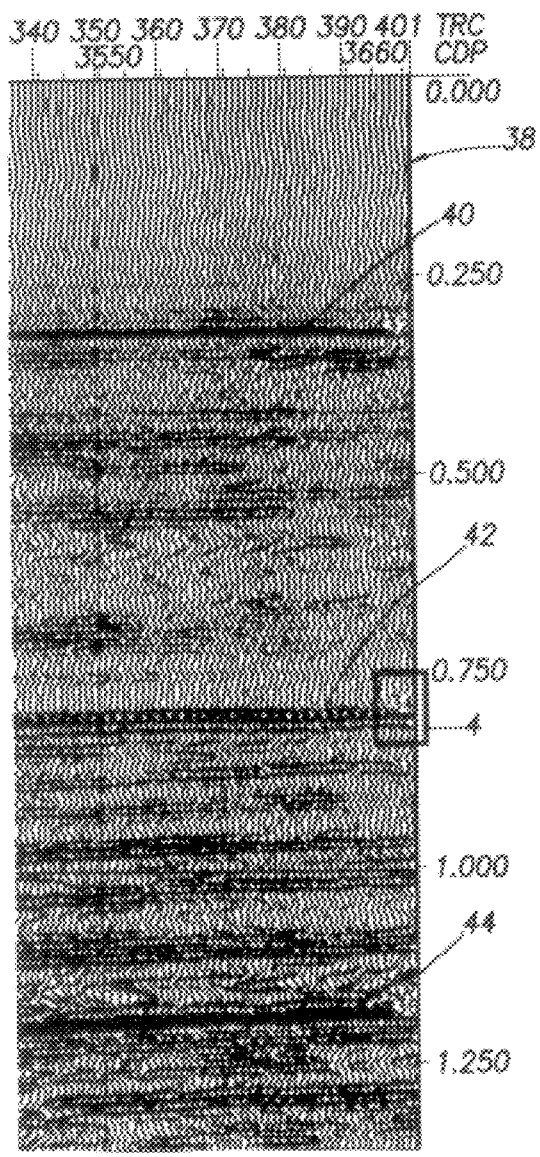
FIG. 3 illustrates the plurality of seismic traces of the reduced seismic data output record.
Figure 4:
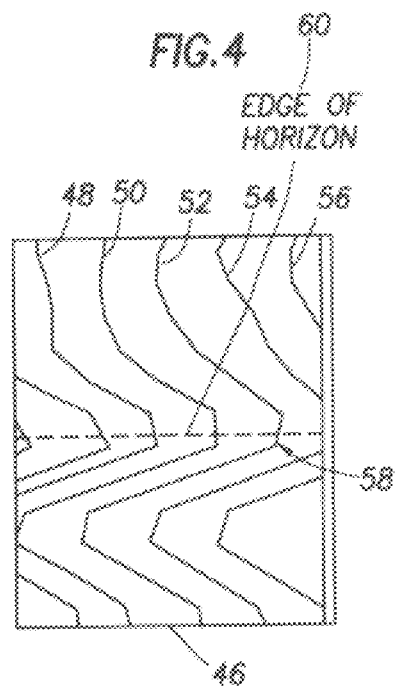
FIGS. 4 and 5 illustrate how the plurality of seismic traces of FIG. 3 can be used to extract information depicting a horizon in a cubic volume of earth of an earth formation.

Referring to FIGS. 3 and 4, referring initially to FIG. 3, a portion of the reduced seismic data output record 30 of FIG. 1 is illustrated. In FIG. 3, the reduced seismic data output record 30 includes a multitude of "seismic traces" 38. The seismic traces 38 further include certain "line-like" sections 40, 42, and 44 which actually represent a "horizon" of the earth formation, such as the horizons 16 of FIG. 1. A portion 46 of the line-like section 42 of the seismic traces 38 of FIG. 3 is shown in greater detail in FIG. 4. In FIG. 4, that portion 46 of line like section 42 of FIG. 3 includes five (5) seismic traces, further including a first seismic trace 48, a second seismic trace 50, a third seismic trace 52, a fourth seismic trace 54, and a fifth seismic trace 56. Each of the seismic traces 48 through 56 have a "peak", such as the "peak" 58 associated with seismic trace 52. When a line 60 interconnects each of the peaks of the seismic traces 48 through 56, as shown in FIG. 4, that line 60 represents an "edge" of a horizon, such as the edge of one of the horizons 16 of FIG. 1.

However, it is important that the line 60 of FIG. 4 pass through the actual peaks of the seismic traces 48 through 56 in order to accurately represent the edge of a horizon. If the line 60 does not pass through the actual peaks of the seismic traces 48 through 56, then, that line 60 does not accurately represent the edge of a horizon.

Figure 5:
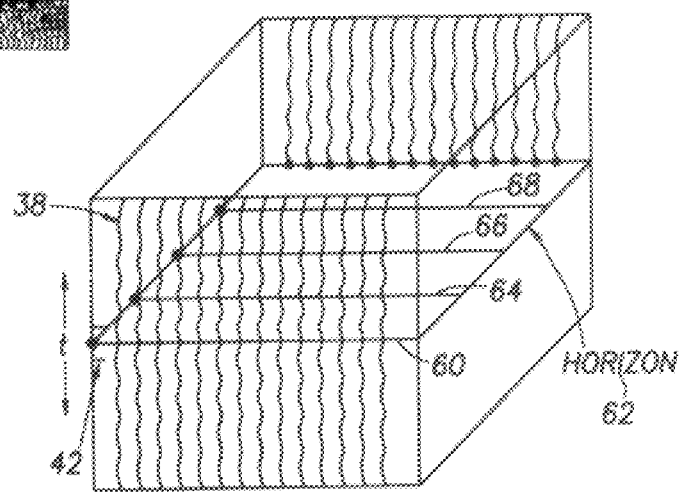

Referring to FIG. 5, the line 60 of FIG. 4 is shown in connection with a three dimensional cube disposed in the earth formation 14 of FIG. 1. The line 60 passes through the peaks of line like section 42 of the multitude of seismic traces 38, and the line 60 does, in fact, represent an edge of a horizon 62. Let us now suppose that other such lines 64, 66, and 68 are similarly drawn through the peaks of other such seismic traces lying in other different planes of the cube, as shown in FIG. 5. When such other lines 64, 66, and 68 are drawn, in addition to the original line 60, through the actual "peaks" of the seismic traces, in the manner shown in FIG. 5, the horizon 62 is actually defined by such lines 60, 64, 66, and 68. However, again, it is very important that the lines 60, 64, 66 and 68 be drawn through the actual "peaks" of the seismic traces. If such lines 60, 64, 66, 68 are not drawn through the actual peaks of the seismic traces, then, the horizon 62 cannot be accurately defined by such lines.

Referring to FIGS. 6 and 7, in FIG. 6, one of the individual seismic traces from the multitude of seismic traces 38 of FIG. 3 is illustrated. Each seismic trace includes a zero crossing, a peak, and a trough. In FIG. 6, the seismic trace shown includes a zero crossing 70, a peak 72, another zero crossing 74, a trough 76, and another zero crossing 78. In FIG. 7, each of the seismic traces are actually comprised of a multitude of "seismic samples". For example, in FIG. 7, the seismic trace shown includes a plurality of seismic samples 80 through 98, and a curve 100 can be drawn through the seismic samples 80 through 98 to form the seismic trace.

Referring to FIGS. 4 and 8, in FIG. 4, an operator sitting at a workstation would (using a mouse) draw a line 60 across the seismic traces on the workstation display, in the manner shown in FIG. 4, hoping that the line 60 would fall on top of the peaks of the seismic traces (such as peak 58 in FIG. 4). Then, the operator would press a key on the keyboard, and the "prior art snapper software" would attempt to locate the line 60 on top of the peaks, such as peak 58. That line would usually be biased toward a sample and not toward the peak. For example, in FIG. 8, the line 60a established by the prior art snapper software was biased toward the samples 102 and away from the peak 104, or the line 60b established by the prior art snapper software was biased toward the samples 106 and away from the peak 104. However, if the prior art snapper software functioned as desired, a majority of the events, such as the peaks, of the seismic traces established by the prior art snapper software should not be located near a sample; rather, the peaks should be evenly distributed relative to the samples. In FIG. 8, when the snapper software of the present invention is used, the line 108 is established, and this line 108 (analogous to line 60 in FIG. 4) is not biased toward the samples 102 or 106; rather, the line 108 established by the snapper software of the present invention is located near the actual peak 104 of the seismic traces shown in FIG. 8. Consequently, since the line 108 in FIG. 8 (analogous to line 60 in FIG. 4) represent the edge of a horizon, and since a multitude of such lines 108 (analogous to lines 60, 64, 66, 68 in FIG. 5) represent the horizon itself, and since the line 108 falls almost directly on the peak 104 in FIG. 8, the horizon (such as horizon 62 of FIG. 5) represented by such lines 108 would be accurately defined.

Referring to FIGS. 9a and 9b, a workstation is illustrated which receives the snapper software of the present invention, from a program storage device, and stores the snapper software of the present invention in a workstation storage memory.

In FIGS. 9a and 9b, a computer workstation 110 is illustrated. The workstation 110 can comprise a Silicon Graphics Indigo2 workstation. The workstation 110 includes a workstation processor 110a operatively connected to a system bus 110c, a workstation storage 110d adapted for storing the snapper software of the present invention connected to the system bus 110c, and a workstation display or recorder 110b operatively connected to the system bus. A program storage device 112, such as a CD-Rom 112, may be inserted into the workstation 110 for the purpose of loading programs, stored on the CD-Rom 112, into the workstation 110. The reduced seismic data output record 30 of FIG. 1 is operatively connected to the system bus 110c in order that the multitude of seismic traces 38 shown in FIG. 3 may be displayed on the workstation display or recorder 110b. The CD-Rom 112 initially stores the "snapper software of the present invention" 116. The snapper software 116 of the present invention, initially stored in the CD-Rom 112, includes a bisection software 116a and a divided difference software 116b. When the CD-Rom 112 is inserted into the workstation 110, the snapper software of the present invention 116 (including the bisection software 116a and the divided difference software 116b) is loaded from the CD-Rom 112 into the workstation storage 110d, the snapper software 116 of the present invention being stored within the workstation storage 110d. The workstation processor 110a will read the snapper software of the present invention 116 from the workstation storage 110d and will execute the snapper software 116. As a result of that execution, the accurate location of events, such as peaks, in each of the multitude of seismic traces 38 of FIG. 3 will be accurately determined, as shown in FIGS. 10 through 13 below. As noted in FIG. 9b, the workstation 110 includes the display 110b, the processor 110a, a keyboard 118, and a mouse 120. The CD-Rom 112 is adapted to be inserted into the workstation 110.

Referring to FIGS. 10 through 13 and 14c, in FIG. 10, some of the seismic traces 38 from FIG. 3 are illustrated. Considering seismic trace 38a, 38b, and 38c in FIG. 10, after the snapper software of the present invention 116 shown in FIG. 9a is executed by the workstation processor 110a, the locations of the various "events" shown in FIG. 6 will be accurately determined; that is, the locations of the event "peaks" 72 and the event "zero crossings" 70, 74, 78 and the event "troughs" 76 of the seismic traces 38a, 38b, and 38c will be accurately determined. Therefore, in connection with seismic traces 38a, 38b, and 38c illustrated in FIG. 10, after the snapper software 116 of the present invention is executed by the workstation processor 110a, the actual locations of the peaks 122 of FIG. 11 and the zero crossings 124 of FIG. 12 and the troughs 126 of FIG. 13 of the seismic traces 38a, 38b and 38c will be accurately determined. Why is this important? This is important because the horizon display 128 shown in FIG. 14c will be accurately represented. Since oil exploration geologists rely on the accuracy of the horizon display 128 of FIG. 14c as one tool for ultimately determining the possible existence of hydrocarbons (e.g., oil) in the earth formation 14 of FIG. 1, the horizon display 128 of FIG. 14c must be accurately represented.

Figure 14C:
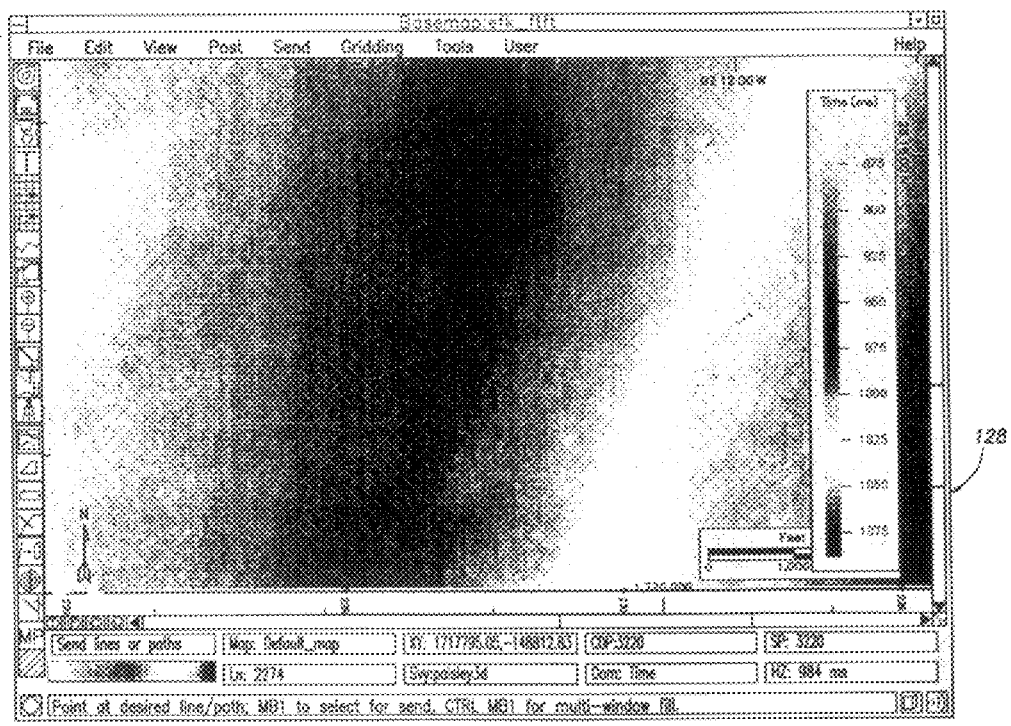

Referring to FIGS. 14a and 14b and 14c, the interactive displays of FIGS. 14a and 14b, presented to the workstation operator sitting at workstation 110 of FIG. 9b, are illustrated. These interactive displays shown in FIGS. 14a and 14b are utilized as examples for disclosing the plurality of interactive procedures utilized by the workstation operator (of the workstation 110 of FIG. 9b) for directing the workstation processor 110a of FIG. 9a to execute the snapper software 116 of the present invention in order to determine the actual locations of the peaks and the zero crossings and the troughs in the multitude of seismic traces 38 of FIG. 3.

In FIG. 14a and 14c, a first interactive display 129 is presented to the workstation operator on the display screen 110b of the workstation 110 of FIG. 9a and 9b. Using the mouse 120 in FIG. 9b, referring to FIG. 14a, the operator draws a line 130 across the first interactive display 129 on the workstation display screen 110b. That line 130 does not fall on the peaks of the seismic traces. For example, referring to FIG. 14a and viewing the expanded box 132 which shows an expanded view of the line 130 over a plurality of peaks 134 of the seismic traces, note that the line 130 does not fall on top of the peaks 134 of the seismic traces in the expanded box 132. As a result, the line 130 does not accurately represent the edge of a horizon 16 in the earth formation 14 of FIG. 1, and any horizon display, similar to the horizon display 128 of FIG. 14c, drawn from the line 130 of FIG. 14a would not be accurate and such horizon display would not accurately represent a real horizon 16 in the earth formation 14 of FIG. 1.

When the operator draws the line 130 across the first interactive display 129 on the workstation display screen 110b in the manner shown in FIG. 14a, since the line 130 in the expanded box 132 does not fall on the peaks 134 of the seismic traces 38, the operator will now continue to perform the "plurality of interactive procedures" by pressing a key 136 on the keyboard 118 of the workstation computer 110 of FIG. 9b. The pressing of the key 136 on the keyboard 118 will cause the snapper software 116 of the present invention, in FIG. 9a, to be executed by the workstation processor 110a. After the snapper software 116 of the present invention is executed, the line 130 in expanded box 132 of FIG. 14a moves to another position which will coincide with the peaks 134 of the seismic traces 38, as shown in FIG. 14b. Refer now to FIG. 14b.

In FIG. 14b and 14c, after the key 136 on keyboard 118 of the workstation 110 is pressed and after the snapper software 116 of the present invention is executed by the workstation processor 110a, as indicated above, a second interactive display 138, shown in FIG. 14b, is displayed on the display screen 110b in FIG. 9b. In the second interactive display 138 of FIG. 14b, note the expanded box 132. In the expanded box 132 of FIG. 14b, note that the line 130 has now moved from its previous position as illustrated in the box 132 of FIG. 14a to a new position. Now, the line 130 in box 132 of FIG. 14b has moved to a new location which now coincides with the tops 134 or the peaks 134 of the seismic traces disposed inside the expanded box 132. As a result, since the line 130 in box 132 of FIG. 14b has moved to coincide with the peaks 134 of the seismic traces, the line 130 in FIG. 14b now accurately represents the "edge" of a horizon, such as the edge of the horizon 16 in FIG. 1. If a horizon display is drawn from the line 130 in FIG. 14b, such as the horizon display 128 shown in FIG. 14c, that horizon display will now accurately represent a real horizon, such as the horizon 16 in the earth formation 14 of FIG. 1.

Figure 15:
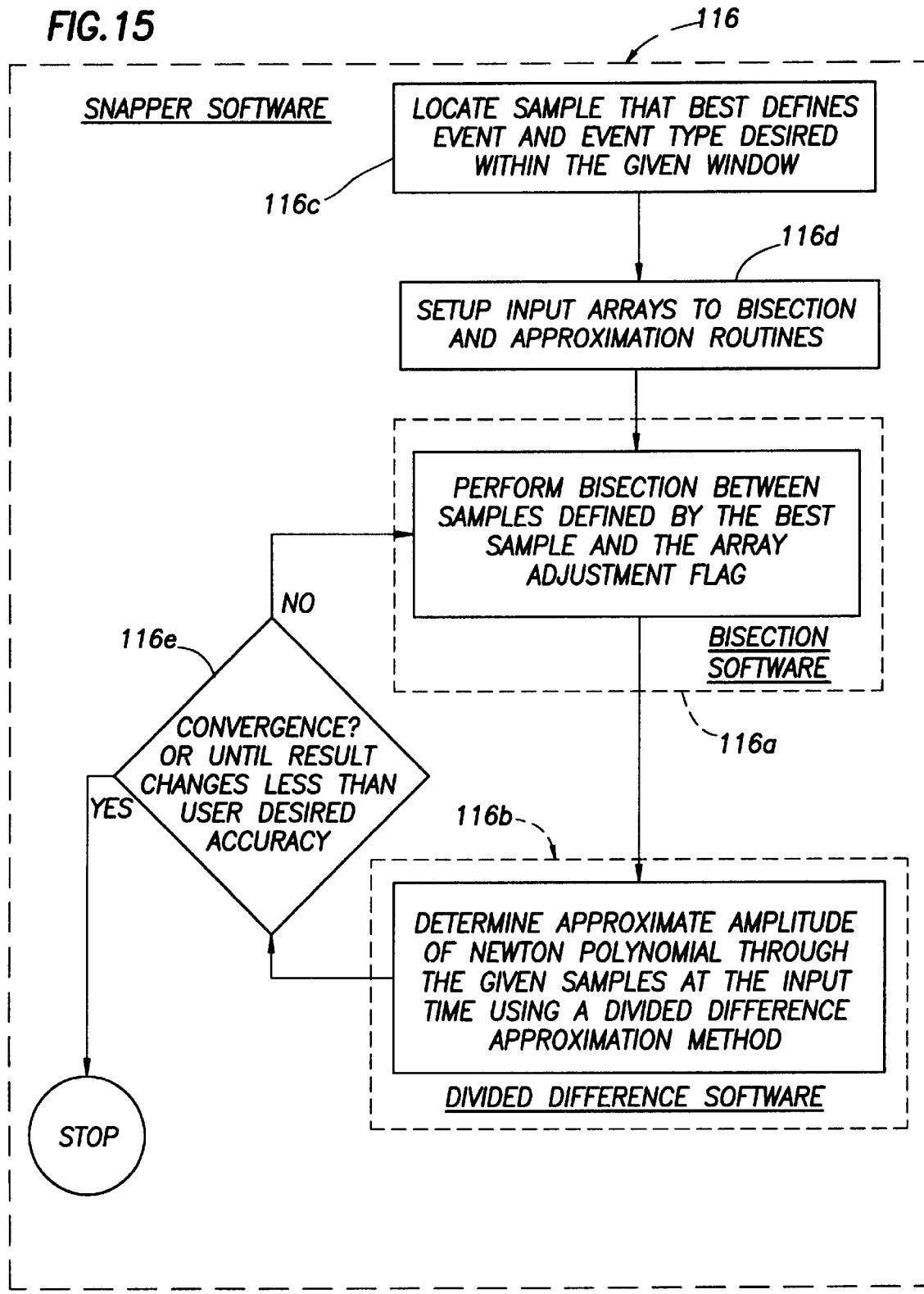
FIG. 15 illustrates a flow chart of the snapper software of the present invention, which includes a bisection software and a divided difference software, this flowchart including four basic steps prior to iteration: (1) locate sample, (2) setup input arrays, (3) perform bisection, and (4) determine approximate amplitude.

Referring to FIG. 15, a flowchart of the snapper software 116 of the present invention, stored in the CD-Rom 112 and loaded from the CD-Rom 112 into the workstation storage 110d of FIG. 9a, is illustrated.

In FIG. 15, the snapper software 116 of the present invention includes five (5) major steps:

(1) Locate the sample that best defines the event and event type desired within the given window, block 116c of FIG. 15

(2) Setup input arrays to bisection and approximation routines, block 116d of FIG. 15

(3) Perform bisection between samples defined by sample and array adjustment flag, block 116a of FIG. 15

(4) Determine approximate amplitude of Newton polynomial through the given samples at the input time using a divided difference approximation method, block 116b of FIG. 15; and (5) Return to step (3) upon convergence or until result changes less than user desired accuracy, at which point, stop, the accurate time and amplitude of the desired event has been determined, block 116e of FIG. 15.

Each of the steps 16c, 116d, 116a, 116b, and 116e of the snapper software 116 of the present invention of FIG. 15 will be discussed below in greater detail with reference to FIGS. 16 and 17 of the drawings.

Referring now to FIGS. 15 through 17b, the first step practiced by the snapper software 116 of the present invention of FIG. 15 is: "locate the 'best sample' that best defines the event and event type desired within the given window", block 116c of FIG. 15. Recall that it is a primary aspect of the present invention to accurately determine the locations of each of the "events", such as the peaks and the troughs and the zero crossings, of each of the seismic traces obtained in response to a seismic operation performed over an earth formation.

Figure 16A:
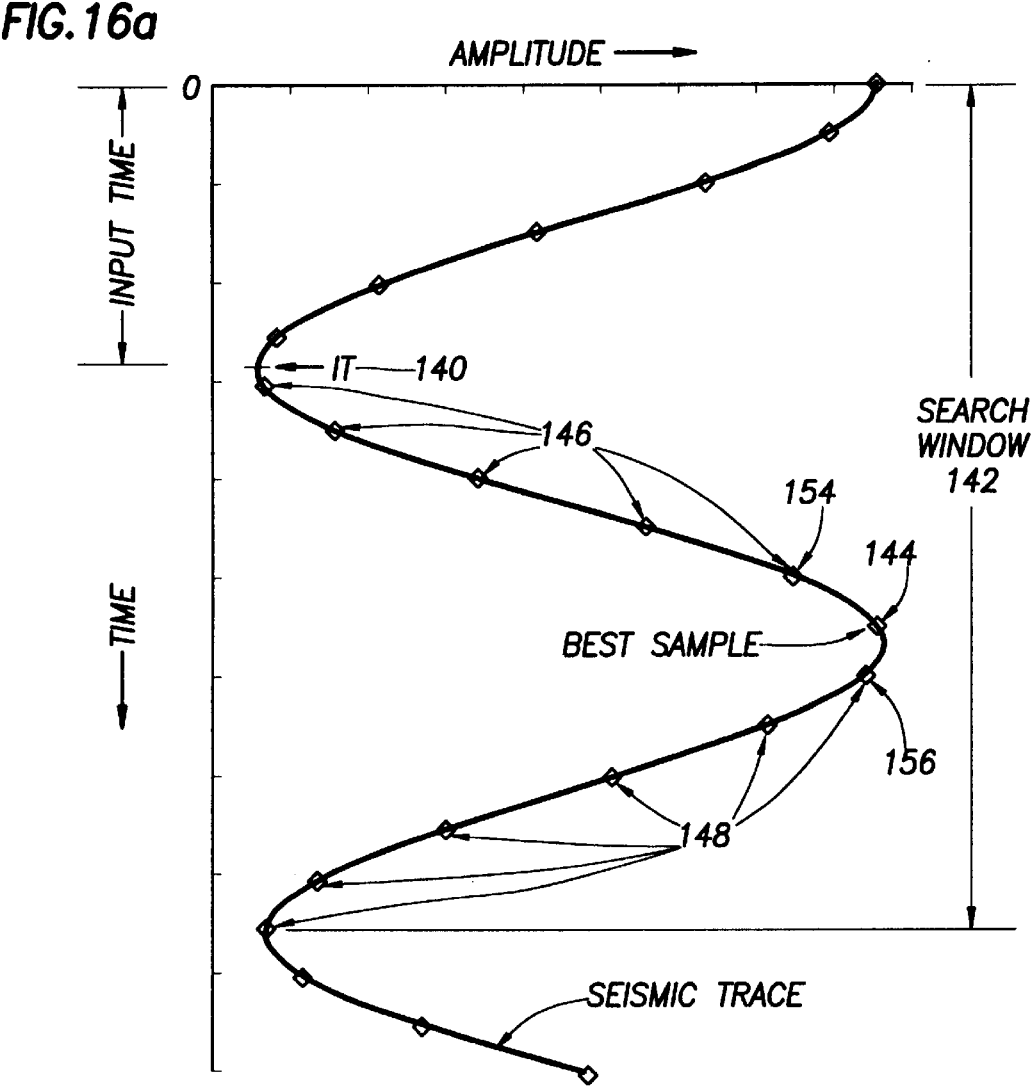

The first step of locating the "best sample" (block 116c of FIG. 15) can be performed by practicing the following sub-steps in connection with a particular event, such as a peak, on a particular seismic trace:

(a) Picking an Input Time Along a Seismic Trace Which is Located Near the Particular Event In FIG. 16a, an input time 140 is selected.

(b) Setting Up a Search Window Around the Selected Input Time

In FIG. 16a, a search window 142 is established around the selected input time 140.

(c) Locating a "Best Sample" Within the Search Window Which Appears to Represent the Event (Such as a Peak), the "Best Sample" Being a Sample of the Seismic Trace Which Lies Within the Search Window and Which Appears to Represent the Event (Such as a Peak)

In FIG. 16a, a "best sample" 144 is located within the search window 142. Since, in our example, we are looking for a "peak" type of event, the sample located within the search window 142 which best represents a "peak" is the sample 144 in FIG. 16a. Note that sample 144 is a "peak" type of event and it is located within the search window 142.

The second step practiced by the snapper software 116 of the present invention of FIG. 15 is: "Setup input arrays to bisection and approximation routines", block 116d of FIG. 15. The second step of setting up input arrays (block 116d of FIG. 15) can be performed by practicing the following sub-steps:

(d) Setting Up Arrays to Store the Locations of Other Samples Which Lie on the Seismic Trace and are Disposed Around Both Sides of the "Best Sample"

In FIG. 16a, note and record the locations (time vs. amplitude) of the samples 146 and the samples 148 which are located on both sides of the "best sample" 144.

(e) Using the Samples Stored in the Arrays to Plot a Curve Which Overlays the Samples Stored in the Arrays In FIGS. 16a and 16b, using the locations (time and amplitude) of each of the samples 146 and the samples 148 of FIG. 16a, in addition to the location of the best sample 144 of FIG. 16a, plot the curve 150 in FIG. 16b around the best sample 144.

The third step practiced by the snapper software 116 of the present invention of FIG. 15 is: "Perform bisection between samples defined by sample and array adjustment flag", block 116a of FIG. 15 (hereinafter called the "Bisection software"). The fourth step practiced by the snapper software 116 of the present invention of FIG. 15 is: "Determine approximate amplitude of Newton polynomial through the given samples at the input time using a divided difference approximation method", block 116b of FIG. 15 (hereinafter called the "Divided Difference software"). The fifth step practiced by the snapper software 116 of the present invention of FIG. 15 is: "Convergence, or until result changes less than user desired accuracy", block 116e of FIG. 15. The third and fourth and fifth steps of performing bisection (block 116a of FIG. 15) and determining approximate amplitudes by recalling amplitudes of seismic samples and performing a divided difference operation for midpoint lines (block 116b of FIG. 15) and determining if convergence has occurred (block 116e of FIG. 15) can be performed by practicing the following sub-step:

(f) Using the Curve, Determining a Time and Amplitude Associated with the Particular Event, Such as a Peak However, this sub-step (f) can be accomplished by further performing sub-steps (f1), (f2), (f3), (f4), (f5), and (f6); however, sub-step (f6) can be accomplished by further performing sub-steps (f61), (f62), (f63), and f(64), as follows:

(f1) Locating the Best Sample on the Curve

In FIG. 16b, the best sample 144 is located on the curve 150, which was previously plotted from samples 146 and 148 of FIG. 16a (F2) Setting Up Another Second Window (Hereinafter Called "the Second Window") Bounded on both Sides of the Best Sample on the Curve, where the Second Window has a First Side and a Second Side, the Width of that Portion of the Second Window Between the Best Sample on the Curve and the First Side Being Equal to 20% of the Distance Between the Best Sample and the Next Adjacent Sample on One Side of the Best Sample on the Curve (i.e., 20% of the Sample Rate), the Width of that Portion of the Second Window Between the Best Sample on the Curve and the Second Side Being Equal to 20% of the Distance Between the Best Sample and the Next Adjacent Sample on the Other Side of the Best Sample on the Curve (i.e., 20% of the Sample Rate)

In FIG. 16b, another second window 152 is set up, the "another second window" 152 being bounded on both sides of the best sample 144 on the curve 150. The "another second window" 152 has a first side 152a and a second side 152b. The width 152c of that portion of said another second window 152 between the best sample 144 on the curve and the first side 152a being equal to 20% of the distance between the best sample 144 and the next adjacent sample 154 on one side of the best sample 144 on the curve 150 (i.e., 20% of the sample rate). The width 152d of that portion of said another second window 152 between the best sample 144 on the curve 150 and the second side 152b being equal to 20% of the distance between the best sample 144 and the next adjacent sample 156 on the other side of the best sample 144 on the curve 150 (i.e., 20% of the sample rate).

Figure 23:
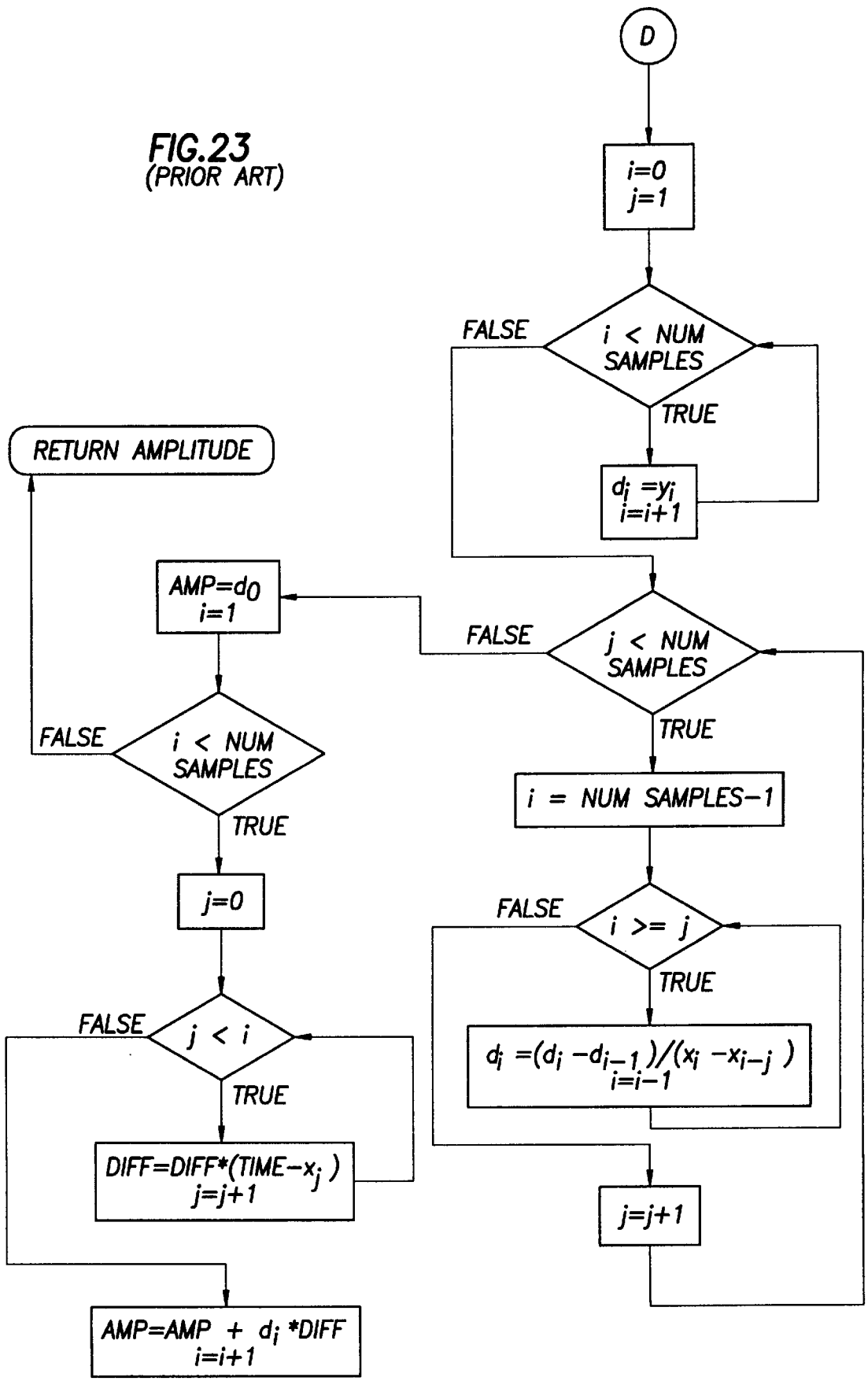
FIG. 23 illustrates the "determine approximate amplitude" portion of the flowchart of FIG. 15 (i.e., the divided difference software).

(f3) Using a Divided Difference Software (of FIG. 23) to Determine the Amplitude A1 of the Curve at the First Side In FIG. 16b, when the "another second window" 152 is set up, determine the amplitude "A1" corresponding to the first side 152a by using the Divided Difference software illustrated in FIG. 23.

(f4) Using a Divided Difference Software (of FIG. 23) to Determine the Amplitude A2 of the Curve at the Second Side In FIG. 16b, determine the amplitude "A2" corresponding to the second side 152b by using the Divided Difference software illustrated in FIG. 23.

(f5) Determining if A2>A1 or if A1>A2

In FIG. 16b, determine if A2 is greater than A1, or if A1 is greater than A2.

(f6) Performing a Bisection Operation (and a Divided Difference Operation at the Midpoint Lines) Between the "Best Sample" on the Curve and "a Second Adjacent Sample" Located Adjacent the "Second Side" of the Second Window when A2>A1; or Performing a Bisection Operation (and Divided Difference Operation at the Midpoint Lines) Between the "Best Sample" on the Curve and "a First Adjacent Sample" Located Adjacent the "First Side" of the Second Window When A1>A2

The Bisection operation and the Divided Difference operation of FIG. 23 can be found in a book called "Numerical Analysis" by David Kincaid and Cheney Ward, 1996, Mathematics of Scientific Computing $2^{nd}$ Edition, Brooks/Cole Publishing, pages 80–84, 350–356, the disclosure of which has already been incorporated by reference into the specification of this application.

In FIG. 16b, assume, for purposes of this description, that amplitude A2 is greater than amplitude A1 (i.e., A2>A1). In that case, in FIG. 16b, a Bisection operation and a Divided Difference operation for midpoint lines must be performed between the "best sample" 144 on the curve 150 in FIG. 16b and "another second sample" 156 which is located adjacent the second side 152b of said another second window 152 (see "Bisect between these two" in FIG. 16b).

However, in order to perform the Bisection operation and the Divided Difference operation in step (f6) between the "best sample" 144 on the curve 150 and "another sample" 156, the following sub-steps must be performed:

(f61) Bisecting or Subdividing, in Half, the Width Between the "Best Sample" and the "Adjacent Sample" Thereby Producing a "First Midpoint Line" which Lies Midway Between the "Best Sample" and the "Adjacent Sample"; Determining a Known Amplitude of the Curve at the "Best Sample" and a Known Amplitude of the Curve at the "Adjacent Sample" (Recall that the Amplitudes of all the Seismic Samples are Already Known); and Comparing the Known Amplitude of the Curve at the "Best Sample" with the Known Amplitude of the Curve at the "Adjacent Sample"

In FIG. 17a, the width 158 between the best sample 144 and the adjacent sample 156 is divided in half thereby producing a midpoint 159, and a first midpoint line 160 is drawn at the midpoint 159, the first midpoint line 160 lying midway between the best sample 144 and the adjacent sample 156. Recall that the amplitude of the best sample 144 and the amplitude of the adjacent sample 156 are both known quantities since the seismic samples (80 through 98 of FIG. 7) were collected as part of the reduced seismic data output record 30 of FIG. 9a. Therefore, the already known amplitude A3 of the curve 150 at the best sample 144 is recalled and determined and the already known amplitude A4 of the curve 150 at the other sample 156 is recalled and determined. The amplitude A3 is compared with the amplitude A4. Clearly, in FIG. 17a, the amplitude A3 at the best sample 144 is greater than the amplitude A4 at the adjacent sample 156. If we are searching for the location of a "peak" type of event, it is now necessary to note the fact that amplitude A3 at the best sample 144 is greater than amplitude A4 at the adjacent sample 156.

(f62) When Determining a "Peak" Type of Event, When the Known Amplitude of the Curve at the "Best Sample" is greater than the Known Amplitude of the Curve at the "Adjacent Sample", Bisecting or Subdividing, in Half, the Width of Another Window Extending Between the "First Midpoint Line" and the "Best Sample" Thereby Producing a "Second Midpoint Line" which Lies Midway Between the "First Midpoint Line" and the "Best Sample", Performing a Divided Difference Operation (FIG. 23) for Determining the Amplitude of the Curve at the "First Midpoint Line" and Recalling the Known Amplitude of the Curve at the "Best Sample", and Comparing the Calculated Amplitude of the Curve at the "First Midpoint Line" with the Known Amplitude of the Curve at the "Best Sample"

In FIG. 17a, since the amplitude A3 of the best sample 144 is greater than the amplitude A4 of the adjacent sample 156, bisect and subdivide, in half, the width 162 of another window between the first midpoint line 160 and the side 164 associated with the best sample 144 thereby producing a second midpoint line 166 which lies midway between the first midpoint line 160 and the side 164 associated with the best sample 144. The Divided Difference operation, illustrated in FIG. 23, is used to determine the amplitude of the midpoint lines. Therefore, perform a divided difference operation to calculate and determine the amplitude "A5" of the curve 150 at the first midpoint line 160, and recall and determine the already known amplitude "A3" of the curve 150 at the side 164 associated with the best sample 144. Compare the calculated amplitude A5 of the curve 150 at the first midpoint line 160 with the already known amplitude of the curve at the side 164 associated with the best sample 144. Note that the calculated amplitude A5 at the first midpoint line 160 is greater than the known amplitude A3 of the side 164 associated with the best sample 144.

(f63) Continuing the Bisecting Step (for Bisecting or Subdividing a Width to Determine a Midpoint Line) and the Determining/Performing Step (for Determining the Amplitude of the Curve on Both Sides of the Midpoint Line) and the Comparing Step (for Comparing such Amplitudes) until the Amplitude of the Curve at the last Midpoint Line, the "nth Midpoint Line", and the Amplitude of the Curve at the Previous Midpoint Line, the "(n−1)th Midpoint Line" Differs by Only a Very Small Tolerance Value (Epsilon)

In FIG. 17a, we have noted that the calculated amplitude A5 at the first midpoint line 160 is greater than the known amplitude A3 of side 164 associated with the best sample 144. Since A5 is greater than A3, when searching for the location of a peak type of event, it is now necessary to continue the bisecting and performing and comparing step by bisecting the width 168 between the second midpoint line 166 and the first midpoint line 160 thereby producing a third midpoint line 170, performing the divided difference operation of FIG. 23 to determine the amplitude of the second midpoint line 166 and recalling the already calculated amplitude (via FIG. 23) of the first midpoint line 160, and comparing the amplitude of the second midpoint line 166 with the amplitude of the first midpoint line 160. The amplitude of the first midpoint line 160 is greater than the amplitude of the second midpoint line 166. Therefore, when attempting to locate a peak type of event, we must now bisect the width 172 between the third midpoint line 170 and the first midpoint line 160 to thereby determine a fourth midpoint line 174, use the Divided Difference operation of FIG. 23 to determine the amplitude of the third midpoint line 170 and recall the already known amplitude of the first midpoint line 160, and compare the newly calculated amplitude of the third midpoint line 170 with the already known amplitude of the first midpoint line 160. If the amplitude of the third midpoint line 170 is greater than the known amplitude of the first midpoint line 160, we must now bisect the width between the fourth midpoint line 174 and the third midpoint line 170 to produce a fifth midpoint line therebetween (not shown). Use the Divided Difference operation of FIG. 23 to determine the amplitude of the fourth midpoint line 174 and recall the already calculated amplitude of the third midpoint line 170. Compare the amplitude of the fourth midpoint line 174 with the amplitude of the third midpoint line 170. If the difference between the amplitude of the fourth and last midpoint line 174 and the amplitude of the third and most recent midpoint line 170 is less than or equal to the tolerance value, epsilon, then, return the "(time, amplitude)" of the last and most recently determined midpoint line, which, in our example, is the fourth midpoint line 174. As a result, in the example of FIG. 17a, the "peak" type of event, which lies within the search window 142 nearest the best sample 144 of FIG. 16a, is located at a "(time, amplitude)" which is equal to the "(time, amplitude)" of the fourth and last midpoint line 174; that is, "(t1, A7)" in FIG. 17a.

At this point, the difference between the amplitude of the "nth midpoint line" (i.e., the fourth midpoint line 174) and the amplitude of the "(n−1)th midpoint line" (i.e., the third midpoint line 170) is known to be within the tolerance value "epsilon".

(f64) When the Difference Between the Amplitude of the Curve at the "nth Midpoint Line" and the Amplitude of the Curve at the "(n−1)th Midpoint Line" is Within the Tolerance Value (Epsilon), the Location of the "Particular Event", such as a Particular Peak, on the "Particular Seismic Trace" Corresponds to the Time and Amplitude of the Last Midpoint Line, the "nth Midpoint Line"

In FIG. 17a, since we have determined (in our example) that the difference between the amplitude of the third midpoint line 170 and the amplitude of the fourth midpoint line 174 is less than the tolerance value, epsilon, the following conclusion can now be drawn: the location (time, amplitude) of one of the "peak" type of events in FIG. 17a, on the seismic trace 150 of FIGS. 16a, 16b, and 17a, is equal to the "(time, amplitude)" associated with the last (i.e., the "nth") midpoint line, i.e., the fourth midpoint line 174.

In FIG. 17b, a mini-flowchart 176 is illustrated which depicts the above part of the snapper software 116 of the present invention discussed above with reference to FIGS. 16a, 16b, and 17a. The mini-flowchart 176 includes the "bisecting or subdividing" step to determine the midpoint lines 160, 166, 170, 174 (block 176a), performing an "amplitude determination operation" (which could include a "divided difference operation") to determine amplitudes (block 176b), and "comparing" the amplitudes (block 176c). As noted in the mini-flowchart 176, the bisection step 176a and the amplitude determination step 176b and the comparison 176c step are repeated until "convergence" occurs, at which point, the (amplitude, time) 176d of the event, such as a "peak", on the seismic trace is generated. The (amplitude, time) 176d is the actual and accurate location of the event, such as the peak or trough or zero crossing.

Referring to FIG. 18, recalling that the (amplitude, time) 176d in FIG. 17b of the event, such as a "peak", on the "particular seismic trace" is approximately equal to the (time, amplitude) of the "nth midpoint line", assume that the (time, amplitude) of the "nth midpoint line" is equal to "t1" and "A1". In FIG. 18, the final output location of an event, such as a peak type of event, on the particular seismic trace is illustrated to be (t1, A1). The event, such as the peak type of event, is accurately located at time "t1" and at amplitude "A1", as shown in FIG. 18.

Referring to FIG. 19, now that we know the actual location of one of the events, such as the peak type of event, on a particular seismic trace is equal to (t, A1), the locations of the other events, such as the other peaks or troughs or zero crossings, associated with other seismic traces can also be located in the same manner, as discussed above. When the locations of all the peaks and all the troughs and all the zero crossings in FIG. 19 are determined, a line 182 can be drawn through the peaks 184, 186, and 188, for example, to thereby determine the "edge of a horizon" 182, as indicated by the location of the line 182 in FIG. 19. When the "edge of a horizon" 182 is accurately determined, an actual horizon, similar to the horizon 128 in FIG. 14c, can be accurately determined.

Figure 20A:
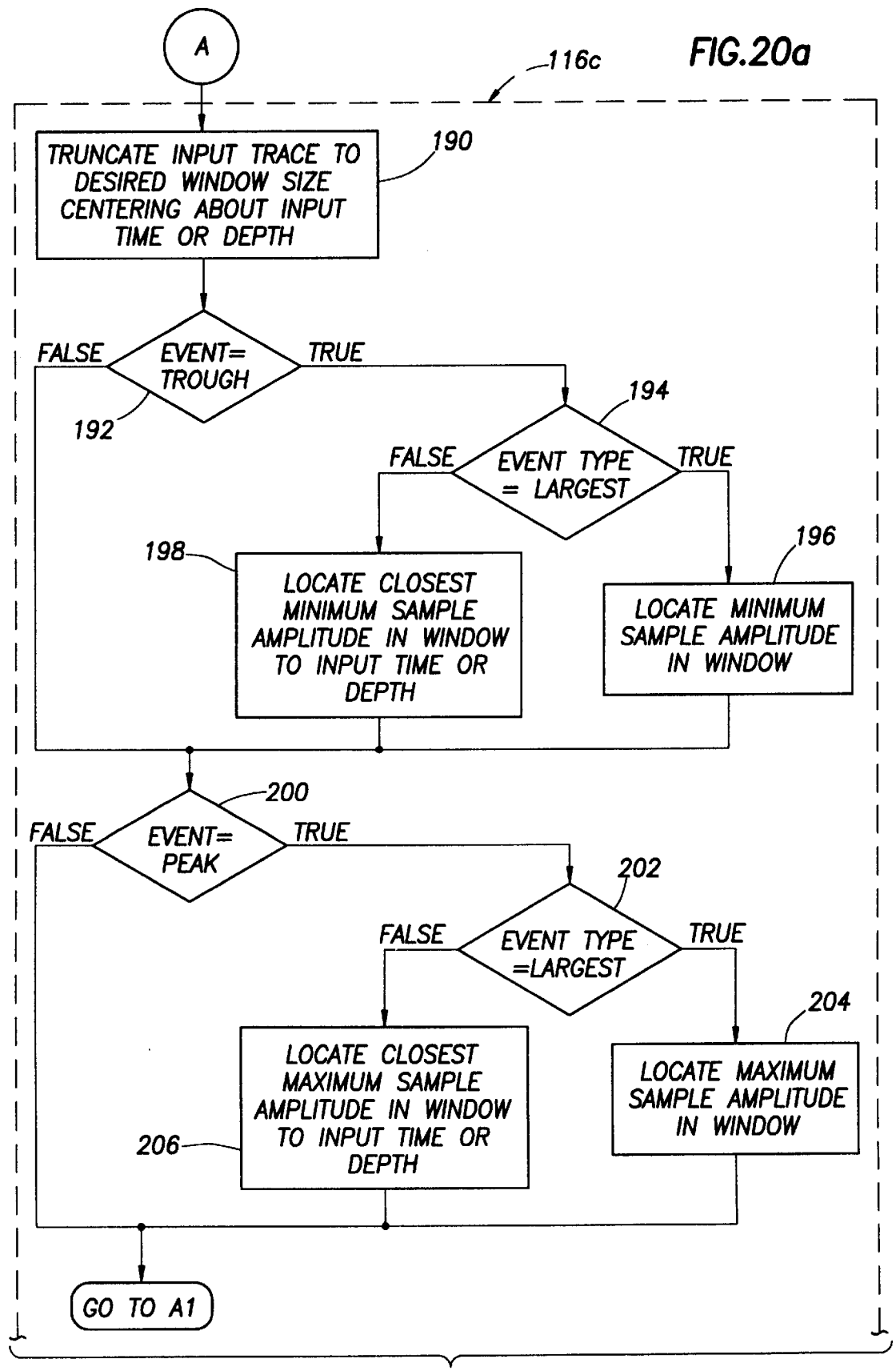
FIGS. 20a and 20b illustrate the "locate sample" portion of the flowchart of FIG. 15.
Figure 20B:
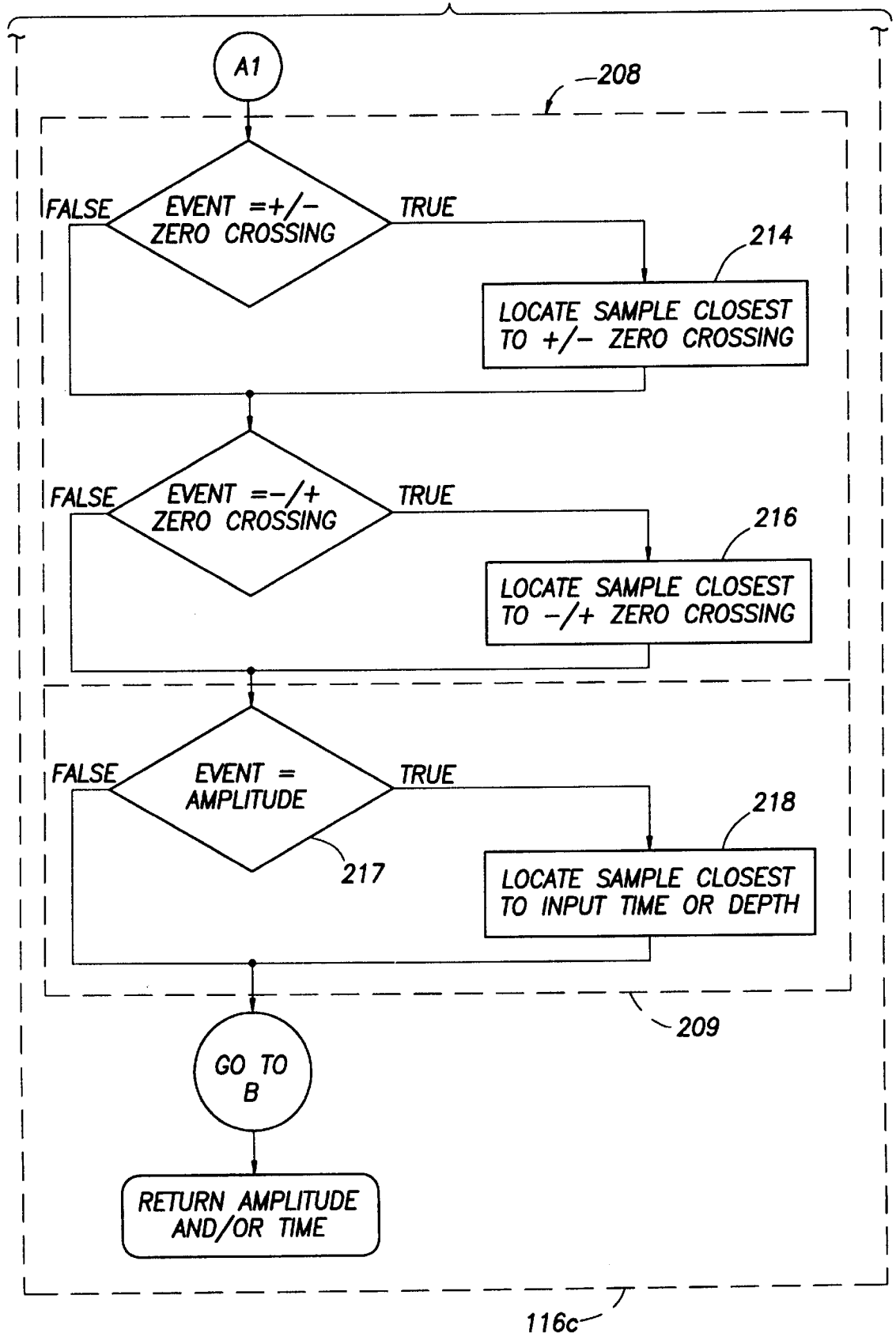

Referring to FIGS. 20a and 20b, a detailed construction of "block 116c" of the snapper software 116 of the present invention of FIG. 15 is illustrated, "block 116c" reflecting the following process step: "locate sample that best defines event and event type desired within the given window".

Recall, from the above discussion with reference to FIG. 16a, that, when a peak type of event is being located within the search window 142, the "best sample" which represents a "peak" type of event and lies within the search window 142 is the seismic sample 144 in FIG. 16a.

In FIG. 20a and 20b, that portion of the snapper software 116 illustrated in FIGS. 20a and 20b is practicing a process which is essentially the same as the process discussed above with reference to FIG. 16a, where the best sample 144 of FIG. 16a was determined to be located within search window 142.

In FIG. 20a, the first step practiced by block 116c of FIG. 15 is block 190: "truncate input trace to desired window size centering about input time or depth". Recall, in FIG. 16a, that the seismic trace of FIG. 16a was truncated to desired search window 142 and was centered about the input time 140. The remaining blocks of FIGS. 20a and 20b are dedicated to locating the best sample, such as the best sample 144 of FIG. 16a.

For example, in FIG. 20a, block 192 asks: "is the event a trough?" If yes, block 194 asks whether the trough type of event is the largest. If yes, the block 196 step indicates "locate minimum sample amplitude in the (search) window"; however, if no, block 198 indicates "locate closest minimum sample amplitude in window into input time or depth". In these steps 196, 198 of FIG. 20a, the minimum sample within the search window 142 of FIG. 16a would be the "best sample" for a trough type of event.

In FIG. 20a, block 200 asks: "is the event a peak?". If yes, blocks 202, 204, and 206 in FIG. 20a are dedicated to locating the maximum sample within the search window 142 of FIG. 16a which would represent the "best sample" for a peak type of event. For example, blocks 202, 204 and 206 in FIG. 20a would locate the best sample 144 in FIG. 16a, which is the best sample representing a peak type of event.

In FIG. 20b, block 208 comprises a plurality of code blocks which are designed for determining the "best sample—zero crossing" which lies within the search window 142 of FIG. 16a. The "best sample—zero crossing" would be a sample which lies within the search window 142 and which is the one sample which lies either directly on or closest to the zero-axis. For example, refer briefly to FIG. 21c and locate sample 210. This sample 210 lies directly on the zero-axis 212; the "best sample—zero crossing" would be the best sample within the search window 142 of FIG. 16a which lies either directly on or closest to the zero axis 212. In FIG. 20b, for example, block 214 indicates "locate sample closest to the +/−zero crossing" for a "+/−" zero crossing event, and block 216 indicates "locate sample closest to −/+zero crossing" for a "−/+" zero crossing event.

In FIG. 20b, Block 217 reads "Event=Amplitude?" and block 209 includes a further block 218 which indicates "locate sample closest to input time or depth"; Block 217 ("event=amplitude") is another option available to the user; it will return an amplitude at a given input time or depth.

Referring to FIGS. 21a, 21b, 21c, 21d, and 21e, a detailed construction of block 116d of FIG. 15 is illustrated, block 116d reflecting the following process step: "setup input arrays to bisection and approximation routines".

Recall from FIG. 16a that the locations (time vs. amplitude) of the samples 146 and the samples 148, which are located on both sides of the "best sample" 144, are noted and recorded. In FIGS. 16a and 16b, using the locations (time and amplitude) of each of the samples 146 and the samples 148 of FIG. 16a, in addition to the location of the best sample 144 of FIG. 16a, the curve 150 in FIG. 16b is plotted around the best sample 144.

Figure 21B:
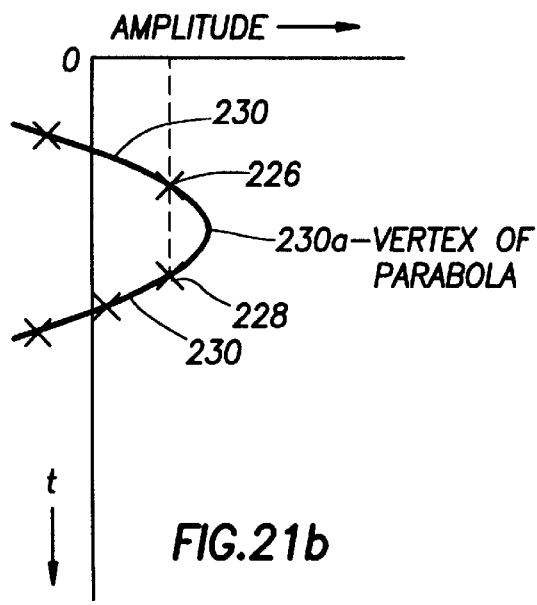
FIGS. 21a through 21e illustrate the "set up input arrays" portion of the flowchart of FIG. 15.
Figure 21C:
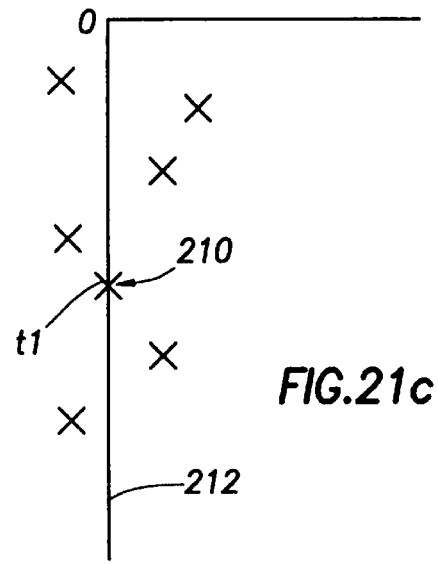
Figure 21A:
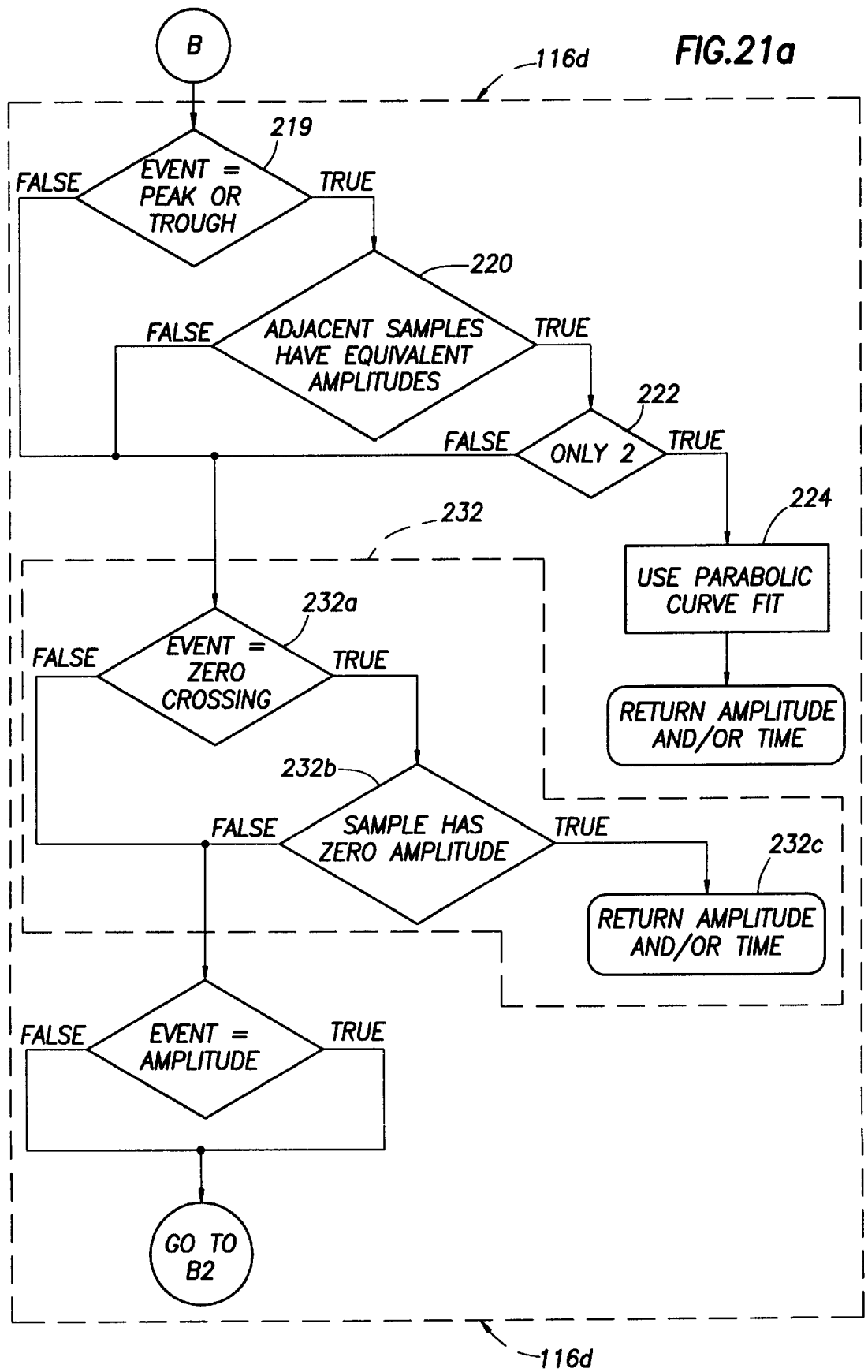
Figure 21D:
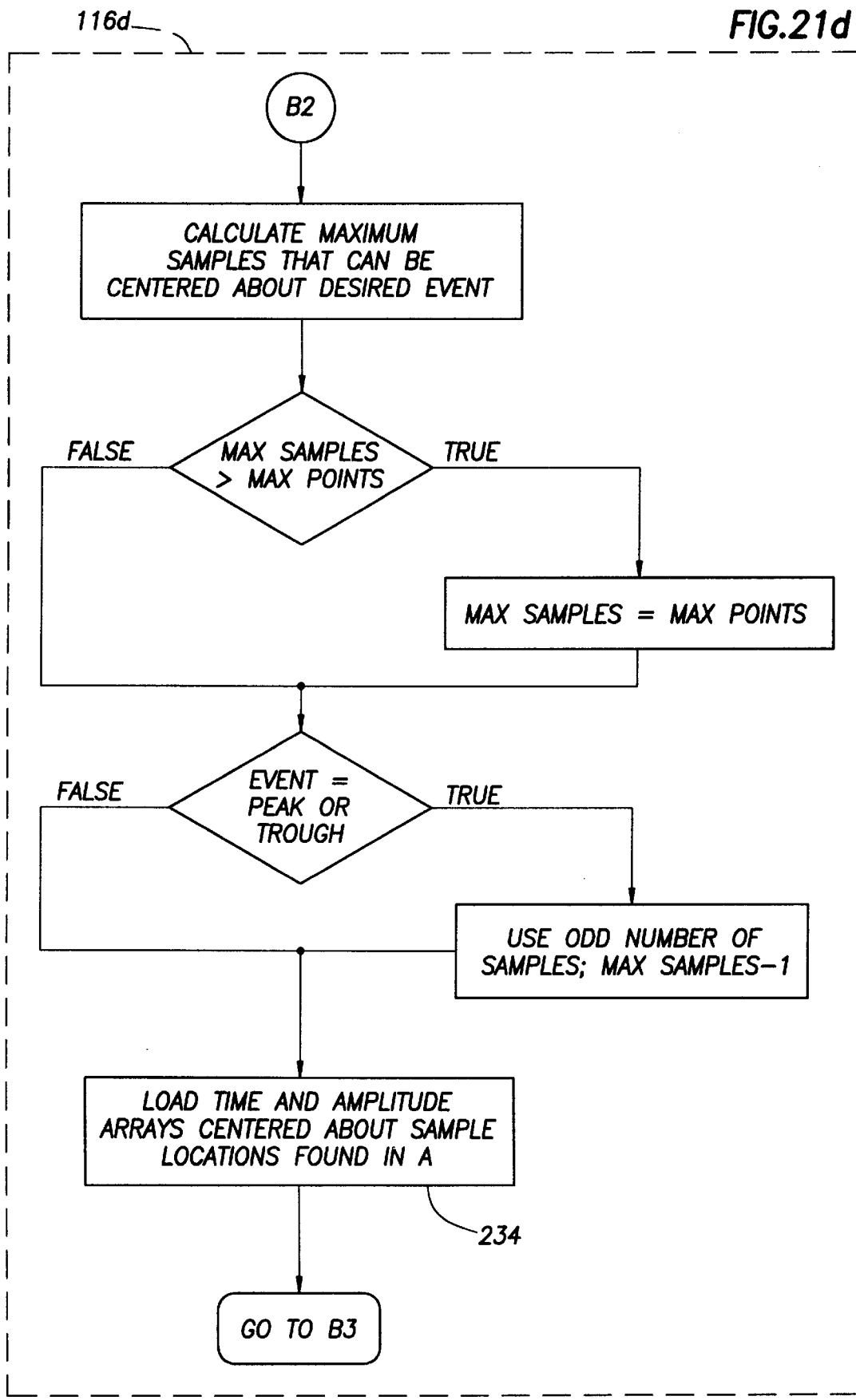
Figure 21E:
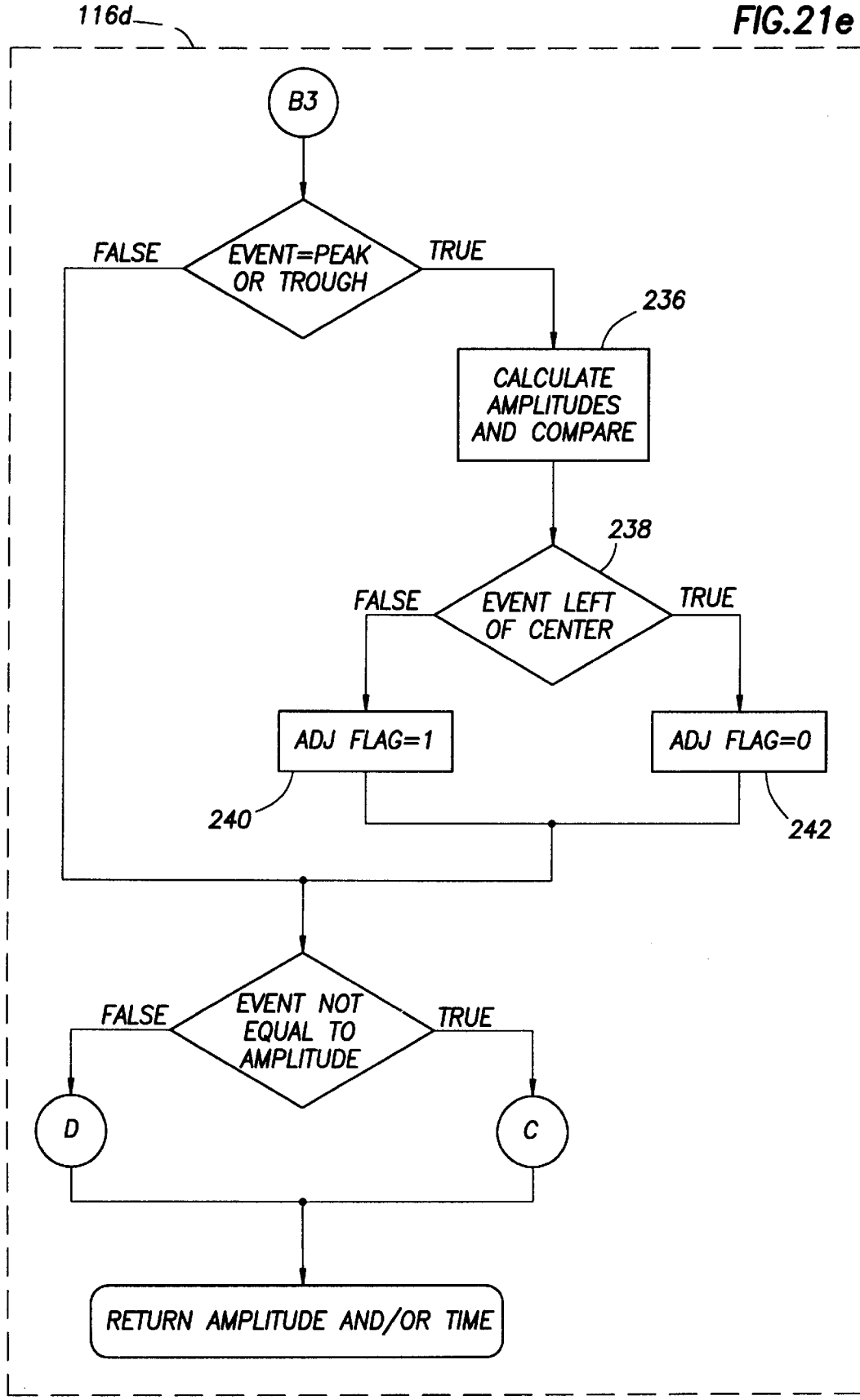

FIGS. 21a, 21d, and 21e reflect that portion of the snapper software 116 of the present invention, of FIG. 9a, which plots the curve 150 in FIG. 16b around the best sample 144. However, FIG. 21a addresses a special case situation.

In FIG. 21a, note block 219, which asks "Event=peak or trough"; and note block 220 which asks "Adjacent samples have equivalent amplitudes"; and note block 222 which asks "Only 2"; and note block 224 which indicates "Use parabolic curve fit". This part of FIG. 21a (blocks 219 through 224) addresses the following "first special situation": when two and only two seismic samples have approximately the same amplitude, a parabolic curve is drawn through those two samples. Refer now to FIG. 21b.

In FIG. 21b, the two seismic samples 226 and 228 have approximately the same amplitude. Therefore, a Parabolic curve 230 is drawn through the samples 226 and 228. A parabolic curve 230 is drawn through the samples 226, 228 because the vertex 230a of the parabola can be easily computed. The vertex 230a is located mid-way between the two samples 226, 228 and the vertex-amplitude is easily computed.

In FIG. 21a, therefore, block 220 ("adjacent samples have equivalent amplitudes") reflects the equal amplitudes of the two samples 226, 228 in FIG. 21b. Block 222 ("only 2") ensures that only two (2) seismic samples (226, 228) have approximately the same amplitudes (i.e., a parabolic curve could not be plotted through three seismic samples which have the same amplitude). Block 224 ("use parabolic curve fit") will draw a parabolic curve 230 through the two seismic samples 226, 228 in FIG. 21b.

In FIG. 21a, note block 232 which contains block 232a ("event=zero crossing") and block 232b ("sample has zero amplitude") and block 232c ("return amplitude and/or time"). Recall that the curve 150 of FIG. 16b was plotted so that the bisection and divided difference operations of FIG. 17a could be performed for the purpose of locating the event (such as a "peak" type of event). This part (block 232 of FIG. 21a) addresses the following "second special situation": when a seismic sample falls directly on a zero crossing. Refer now to FIG. 21c.

In FIG. 21c, note that seismic sample 210 falls directly on the zero axis 212. Since the sample 210 falls directly on the zero axis 212, there is no need to plot a curve through the seismic samples of FIG. 21c for the ultimate purpose of performing the bisection and divided difference operations of FIG. 17a. We already know the location (t1, 0) of the seismic sample 210.

In FIG. 21a, since the event (sample 210 of FIG. 21c) is a zero crossing (block 232a of FIG. 21a) and since the sample 210 of FIG. 21c has a zero amplitude (block 232b of FIG. 21a), a curve need not be plotted through the sample 210; as a result, the time and amplitude (t1, 0) of the seismic sample 210 can be returned (block 232c of FIG. 21a) without plotting a curve through the samples and performing the bisection and divided difference operations mentioned above with reference to FIG. 17a.

If a set of seismic samples are encountered which do not fall within the first special situation of FIG. 21b or the second special situation of FIG. 21c, that portion of the snapper software 116 illustrated in FIG. 21d will be executed.

In FIG. 21d, since a parabolic curve will not be drawn through the seismic samples as indicated by the first special situation of FIG. 21b (when two samples have the same amplitude) and since a seismic sample does not fall directly on the zero axis as indicated by the second special situation of FIG. 21c, then, the seismic samples 146 and 148 of FIG. 16a must be plotted and a curve 150 of FIG. 16b must be drawn through those seismic samples in the same manner discussed above with reference to FIG. 16b. However, the curve 150 in FIG. 16b which is drawn through the seismic samples 146, 148 is based on a "Newton Polynomial" (it is not based on a "parabola").

In FIG. 21d, the snapper software 116d of FIG. 21d represents that portion of the snapper software 116 of the present invention which stores the (time, amplitude) of each of the seismic samples 146, 148 of FIG. 16a for the purpose of plotting the curve 150 of FIG. 16b through those seismic samples for the further purpose of determining where to begin bisecting (see "bisect between these two" in FIG. 16b) and for performing the bisection and divided difference operations of FIG. 17a.

In FIG. 21d, for example, note block 234 which performs the following step: "load time and amplitude arrays centered about sample locations found in A". In FIG. 21d, block 234 loads and stores the (time, amplitude) of the seismic samples 146 and 148 of FIG. 16a for the purpose of plotting those samples 146, 148 and drawing a Newton Polynomial through those samples 146, 148 in the manner discussed above with reference to FIG. 16b.

In FIG. 21e, that portion of the snapper software 116d of the present invention shown in FIG. 21e will perform the "20% operation" shown in FIG. 16b. In the "20% operation", recall from FIG. 16b that the distance 152c between the line 152a and the best sample 144 is 20% of the distance between the best sample 144 and the next adjacent sample 154 (on one side of the best sample). Recall again, from FIG. 16b, that the distance 152d between the best sample 144 and the line 152b is 20% of the distance between the best sample 144 and the next adjacent sample 156 (on the other side of the best sample). The snapper software 116d illustrated in FIG. 21e will perform the "20% operation" to determine the location of line 152a in FIG. 16b on one side of the best sample 144 and the location of line 152b in FIG. 16b on the other side of the best sample 144. More particularly, in FIG. 21e, refer to block 236 entitled "calculate amplitudes and compare". During the execution of block 236 of FIG. 21e, recall that the "sample rate" is known. Therefore, in FIG. 16b, the locations (in terms of time and amplitude) of samples 154, 144, and 156 are known. Therefore, in FIG. 16b, 20% of the known "sample rate" will produce the location of line 152a in FIG. 16b and the location of line 152b in FIG. 16b. Now that the locations of lines 152a and 152b in FIG. 16b are known, software block 236 of FIG. 21e will use the software illustrated in FIG. 23 (and discussed below) to calculate the amplitude of the line 152a in FIG. 16b and the amplitude of the line 152b in FIG. 16b. Block 236 of FIG. 21e will then compare the calculated amplitude of line 152a in FIG. 16b with the calculated amplitude of line 152b in FIG. 16b. Depending upon the type of event (such as a peak type of event), the comparison of the calculated amplitudes of lines 152a and 152b will determine if the peak type of event is "left of center", block 238 of FIG. 21e. An array adjustment flag will be set depending on whether the event is "left of center", blocks 240 and 242 of FIG. 21e.

Referring to FIG. 22, a detailed construction of the "Bisection software" shown in block 116a of FIG. 15 is illustrated. Block 116a representing the "Bisection software" performs the following process step: "perform bisection between samples defined by the best sample and the array adjustment flag".

In FIG. 22, recall from FIG. 16b that we are bisecting between the best sample 144 and the sample 156 (see "Bisect between these two" in FIG. 16b). Now, referring back to FIG. 17a where the detailed description of the aforementioned bisection takes place, recall that the first midpoint line 160 is determined, and the amplitude A3 is compared with the amplitude A4. Since A3>A4 (for a peak type of event), the second midpoint line 166 is determined between the first midpoint line 160 and the line 164 associated with the best sample 144, and the amplitude A5 of the first midpoint line 160 is compared with the amplitude A3 of the line 164 associated with the best sample 144. Since A5>A3 (for a peak type of event), a third midpoint line 170 is determined between the second midpoint line 166 and the first midpoint line 160, and the amplitude A5 of the first midpoint line 160 is compared with the amplitude A6 of the second midpoint line 166. Since A5>A6, a fourth midpoint line 174 is determined and the amplitude of the third midpoint line 170 is compared with the amplitude of the first midpoint line 160. If the amplitude of the third midpoint line 170 is greater than the amplitude of the first midpoint line 160, a fifth midpoint line (not shown) is located between the fourth midpoint line 174 and the third midpoint line 170 and the amplitude of the fourth midpoint line 174 is compared with the amplitude of the third midpoint line 170. If the difference between the amplitude of the fourth midpoint line 174 and the amplitude of the third midpoint line 170 is less than or equal to the tolerance value, epsilon, the last midpoint line time and amplitude is returned; and, as a result, the fourth midpoint line 174 (time, amplitude) is returned. In general, this process continues until the difference between the amplitude of a previous midpoint line and the amplitude of the last midpoint line is less than or equal to a tolerance value, epsilon. For example, if the difference between the amplitude of the previous midpoint line 170 and the amplitude of the last midpoint line 174 is less than the tolerance value, epsilon, the location of the event, such as the peak type of event, is determined to be equal to the location of the last midpoint line 174.

In FIG. 22, the aforementioned bisection operation takes place in FIG. 22. In FIG. 22, block 244 determines which samples bracket the event; in FIG. 17a, the best sample 144 and the sample 156 brackets a peak type of event. In FIG. 22, block 246 indicates "prev amp—curr amp>epsilon"; during the first iteration in FIG. 22, "prev amp" in block 246 is set to "0" and "curr amp" in block 246 will have an event driven value which will assure that "prev amp—curr amp>epsilon". In FIG. 22, block 248 determines the location first midpoint line 160 and block 250 in FIG. 22 (which represents the Divided Difference software illustrated in FIG. 23) determines the amplitude of the first midpoint line 160. At this point, we know the amplitude A3 associated with the best sample 144 in FIG. 17a (the amplitudes of all seismic samples are known), we know the amplitude A4 of sample 156, and we know the previously calculated amplitude A5 of the first midpoint line 160. Now, block 252 of FIG. 22 is executed. Block 252 will determine if the event is a peak or a trough or a zero crossing, and it will compare the amplitude A3 with the amplitude A4 in FIG. 17a, and it will determine if amplitude A3 is greater than A4. At this point, execution of block 252 of FIG. 22 is complete and block 246 of FIG. 22 will be re-executed to determine if (A3−A4) is greater than epsilon (the tolerance value). Since (A3−A4) is greater than epsilon, blocks 248, 250, and 252 will be re-executed, and the above process will be repeated until it is determined during the last iteration that, in our example, the difference between the amplitude of the third midpoint line 170 in FIG. 17a and the amplitude of the fourth midpoint line 174 is less than or equal to the tolerance value, epsilon. During the last iteration, "prev amp" in block 246 stores the "the amplitude of the previously calculated midpoint line" and "curr amp" in block 246 stores "the amplitude of the last midpoint line"; as a result, block 246 stores and compares the amplitude of the last midpoint line 174 (of FIG. 17a) with the amplitude of the previously calculated midpoint line 170 (of FIG. 17a) and finds the difference to be less than or equal to epsilon. At this point, the location, in terms of time and amplitude, of the "peak" type of event disposed within the search window 142 nearest the best sample 144 in FIG. 16a will be determined to be equal to the location of the "last midpoint line", which in our example is the fourth midpoint line 174 of FIG. 17a.

Referring to FIG. 23, a detailed construction of the "Divided Difference software" shown in block 116b of FIG. 15 is illustrated. Block 116b representing the "Divided Difference software" performs the following process step: "Determine approximate amplitude of Newton polynomial through the given samples at the input time using a divided difference approximation method". The Divided Difference software illustrated in FIG. 23 is represented by block 250 ("D") in FIG. 22. The Divided Difference software represented by block 250 ("D") in FIG. 22 and illustrated in FIG. 23 will calculate and determine and temporarily store for later processing the amplitude of the midpoint lines 160, 166, 170, and 174 in FIG. 17a. The Divided Difference software of FIG. 23 is also used in Block 236 of FIG. 21e to calculate the amplitude of line 152a of FIG. 16b and the amplitude of line 152b of FIG. 16b; recall that line 152a of FIG. 16b is located at a point which is 20% of the distance from best sample 144 to the sample 154 and line 152b in FIG. 16b is located at a point which is 20% of the distance from the best sample 144 to the sample 156 in FIG. 16b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A program storage device readable by a machine, tangibly embodying a program of instructions executable by the machine to perform method steps for accurately locating a particular event of a plurality of events in a particular seismic trace among a plurality of seismic traces, said method steps comprising the steps of:

(a) locating a best sample of said particular seismic trace that lies within a search window, the best sample most accurately representing said particular event within said search window;

(b) locating other samples around the best sample in said search window including a first adjacent sample on one side of the best sample and a second adjacent sample on the other side of the best sample;

(c) selecting either said first adjacent sample or said second adjacent sample, (d) performing a bisection operation and an amplitude determination operation between the best sample and the adjacent sample selected during the selecting step (c) to thereby determine and locate said particular event of said plurality of events in said particular seismic trace among said plurality of seismic traces.

2. The program storage device of claim 1, wherein the selecting step (c) comprises the steps of:

(c1) determining a first line between said best sample and said first adjacent sample and determining a first amplitude of said first line;

(c2) determining a second line between said best sample and said second adjacent sample and determining a second amplitude of said second line;

(c3) comparing said first amplitude with said second amplitude and determining if said first amplitude is greater than said second amplitude; and (c4) selecting either said first adjacent sample or said second adjacent sample in response to the comparing and determining step (c3).

3. The program storage device of claim 2, wherein said first line is located at a first distance from said best sample, said first distance between said first line and said best sample being approximately equal to twenty percent (20%) of a distance between said best sample and said first adjacent sample.

4. The program storage device of claim 3, wherein said second line is located at a second distance from said best sample, said second distance between said second line and said best sample being approximately equal to twenty percent (20%) of a distance between said best sample and said second adjacent sample.

5. The program storage device of claim 1, wherein the performing step (d), for performing a bisection operation and an amplitude determination operation between the best sample and the adjacent sample selected during the selecting step (c) to thereby determine and locate said particular event, comprises the steps of:

(d1) selecting a first midpoint between the best sample and the adjacent sample;

(d2) comparing a first amplitude of said best sample with a second amplitude of said adjacent sample and selecting one of said best sample or said adjacent sample in response to the comparing step when a difference between said first amplitude and said second amplitude is greater than a tolerance value;

(d3) selecting a second midpoint between the first midpoint and said one of said best sample or said adjacent sample selected during the selecting step (d2);

(d4) comparing a third amplitude of said first midpoint with a fourth amplitude of said one of said best sample or said adjacent sample and selecting one of said first midpoint or said one of said best sample or said adjacent sample when a difference between said third amplitude and said fourth amplitude is greater than said tolerance value, (d5) repeating the selecting step (d1) for selecting a third midpoint and, using said second midpoint, repeating the comparing and selecting step (d2) for comparing said second midpoint with said one of said first midpoint or said one of said best sample or said adjacent sample when a difference between a fifth amplitude of said second midpoint and a sixth amplitude of said one of said first midpoint or said one of said best sample or said adjacent sample is greater than said tolerance value, and (d6) selecting said first midpoint to represent said particular event when said difference between said third amplitude of said first midpoint and said fourth amplitude of said one of said best sample or said adjacent sample is less than or equal to said tolerance value.

6. The program storage device of claim 4, wherein the performing step (d), for performing a bisection operation and an amplitude determination operation between the best sample and the adjacent sample selected during the selecting step (c) to thereby determine and locate said particular event, comprises the steps of:

(d1) selecting a first midpoint between the best sample and the adjacent sample;

(d2) comparing a third amplitude of said best sample with a fourth amplitude of said adjacent sample and selecting one of said best sample or said adjacent sample in response to the comparing step when a difference between said third amplitude and said fourth amplitude is greater than a tolerance value;

(d3) selecting a second midpoint between the first midpoint and said one of said best sample or said adjacent sample selected during the selecting step (d2);

(d4) comparing a fifth amplitude of said first midpoint with a sixth amplitude of said one of said best sample or said adjacent sample and selecting one of said first midpoint or said one of said best sample or said adjacent sample when a difference between said fifth amplitude and said sixth amplitude is greater than said tolerance value, (d5) repeating the selecting step (d1) for selecting a third midpoint and, using said second midpoint, repeating the comparing and selecting step (d2) for comparing said second midpoint with said one of said first midpoint or said one of said best sample or said adjacent sample when a difference between a seventh amplitude of said second midpoint and an eighth amplitude of said one of said first midpoint or said one of said best sample or said adjacent sample is greater than said tolerance value, and (d6) selecting said first midpoint to represent said particular event when said difference between said fifth amplitude of said first midpoint and said sixth amplitude of said one of said best sample or said adjacent sample is less than or equal to said tolerance value.

7. Apparatus responsive to keyboard actuation by a workstation operator for snapping a line drawn across a plurality of seismic traces on a workstation display to a plurality of desired events associated with said plurality of seismic traces, comprising:

best sample location means responsive to said keyboard actuation for locating a plurality of best samples corresponding, respectively, to said plurality of seismic traces, said plurality of best samples lying within a search window and being located in the vicinity of said line, said best samples most accurately representing said plurality of desired events among said plurality of seismic traces;

bisection means for bisecting between said plurality of best samples of said plurality of seismic traces and a corresponding plurality of next adjacent samples disposed adjacent to the best samples;

amplitude determination means for determining a first plurality of amplitudes associated, respectively, with the plurality of best samples and a second plurality of amplitudes associated, respectively, with the plurality of next adjacent samples; and moving means responsive to the determination of said first plurality of amplitudes and said second plurality of amplitudes by said amplitude determination means for moving said line drawn across said plurality of seismic traces on said workstation display to said plurality of desired events associated with said plurality of seismic traces when a difference between said first plurality of amplitudes and said second plurality of amplitudes is less than or equal to a tolerance value.

8. The apparatus of claim 7, wherein said bisection means, for bisecting between said plurality of best samples of said plurality of seismic traces and a corresponding plurality of next adjacent samples disposed adjacent to the best samples, comprises:

first line location means for locating a plurality of first lines disposed on one side of the best samples, said plurality of first lines each being located approximately twenty percent (20%) of a distance between the plurality of best samples and a plurality of first next adjacent samples;

second line location means for locating a plurality of second lines disposed on the other side of the best samples, said plurality of second lines each being located approximately twenty percent (20%) of a distance between the plurality of best samples and a plurality of second next adjacent samples;

comparing means for comparing a plurality of first amplitudes associated with said plurality of first lines with a plurality of second amplitudes associated with said plurality of second lines; and selection means for selecting either said plurality of first next adjacent samples or said plurality of second next adjacent samples in response to the comparison made by said comparing means.

9. The apparatus of claim 8, wherein said bisection means further comprises:

midpoint line determination means responsive to the selection of either said plurality of first next adjacent samples or said plurality of second next adjacent samples made by said selection means for locating a plurality of midpoint lines between said plurality of best samples of said plurality of seismic traces and said either said plurality of first next adjacent samples or said plurality of second next adjacent samples which are disposed adjacent to the best samples.

10. A method for accurately locating a particular event of a plurality of events in a particular seismic trace among a plurality of seismic traces, comprising the steps of:

(a) locating a best sample of said particular seismic trace that lies within a search window, the best sample most accurately representing said particular event within said search window;

(b) locating other samples around the best sample in said search window including a first adjacent sample on one side of the best sample and a second adjacent sample on the other side of the best sample;

(c) selecting either said first adjacent sample or said second adjacent sample, (d) performing a bisection operation and an amplitude determination operation between the best sample and the adjacent sample selected during the selecting step (c) to thereby determine and locate said particular event of said plurality of events in said particular seismic trace among said plurality of seismic traces.

11. The method of claim 10, wherein the selecting step (c) comprises the steps of:

(c1) determining a first line between said best sample and said first adjacent sample and determining a first amplitude of said first line;

(c2) determining a second line between said best sample and said second adjacent sample and determining a second amplitude of said second line;

(c3) comparing said first amplitude with said second amplitude and determining if said first amplitude is greater than said second amplitude; and (c4) selecting either said first adjacent sample or said second adjacent sample in response to the comparing and determining step (c3).

12. The method of claim 11, wherein said first line is located at a first distance from said best sample, said first distance between said first line and said best sample being approximately equal to twenty percent (20%) of a distance between said best sample and said first adjacent sample.

13. The method of claim 12, wherein said second line is located at a second distance from said best sample, said second distance between said second line and said best sample being approximately equal to twenty percent (20%) of a distance between said best sample and said second adjacent sample.

14. The method of claim 10, wherein the performing step (d), for performing a bisection operation and an amplitude determination operation between the best sample and the adjacent sample selected during the selecting step (c) to thereby determine and locate said particular event, comprises the steps of:

(d1) selecting a first midpoint between the best sample and the adjacent sample;

(d2) comparing a first amplitude of said best sample with a second amplitude of said adjacent sample and selecting one of said best sample or said adjacent sample in response to the comparing step when a difference between said first amplitude and said second amplitude is greater than a tolerance value;

(d3) selecting a second midpoint between the first midpoint and said one of said best sample or said adjacent sample selected during the selecting step (d2);

(d4) comparing a third amplitude of said first midpoint with a fourth amplitude of said one of said best sample or said adjacent sample and selecting one of said first midpoint or said one of said best sample or said adjacent sample when a difference between said third amplitude and said fourth amplitude is greater than said tolerance value, (d5) repeating the selecting step (d1) for selecting a third midpoint and, using said second midpoint, repeating the comparing and selecting step (d2) for comparing said second midpoint with said one of said first midpoint or said one of said best sample or said adjacent sample and selecting one of said second midpoint or said one of said first midpoint or said one of said best sample or said adjacent sample when a difference between a fifth amplitude of said second midpoint and a sixth amplitude of said one of said first midpoint or said one of said best sample or said adjacent sample is greater than said tolerance value, and (d6) selecting said second midpoint to represent said particular event when said difference between said fifth amplitude of said second midpoint and said sixth amplitude of said one of said first midpoint or said one of said best sample or said adjacent sample is less than or equal to said tolerance value.

15. The method of claim 13, wherein the performing step (d), for performing a bisection operation and an amplitude determination operation between the best sample and the adjacent sample selected during the selecting step (c) to thereby determine and locate said particular event, comprises the steps of:

(d1) selecting a first midpoint between the best sample and the adjacent sample;

(d2) comparing a third amplitude of said best sample with a fourth amplitude of said adjacent sample and selecting one of said best sample or said adjacent sample in response to the comparing step when a difference between said third amplitude and said fourth amplitude is greater than a tolerance value;

(d3) selecting a second midpoint between the first midpoint and said one of said best sample or said adjacent sample selected during the selecting step (d2);

(d4) comparing a fifth amplitude of said first midpoint with a sixth amplitude of said one of said best sample or said adjacent sample and selecting one of said first midpoint or said one of said best sample or said adjacent sample when a difference between said fifth amplitude and said sixth amplitude is greater than said tolerance value, (d5) repeating the selecting step (d1) for selecting a third midpoint and, using said second midpoint, repeating the comparing and selecting step (d2) for comparing said second midpoint with said one of said first midpoint or said one of said best sample or said adjacent sample and selecting one of said second midpoint or said one of said first midpoint or said one of said best sample or said adjacent sample when a difference between a seventh amplitude of said second midpoint and an eighth amplitude of said one of said first midpoint or said one of said best sample or said adjacent sample is greater than said tolerance value, and (d6) selecting said second midpoint to represent said particular event when said difference between said seventh amplitude of said second midpoint and said eighth amplitude of said one of said first midpoint or said one of said best sample or said adjacent sample is less than or equal to said tolerance value.

16. A method for determining the location of a particular event on a seismic trace among a plurality of events of a plurality of seismic traces obtained in response to a seismic operation performed over an earth formation, comprising the steps of:

(a) picking an input time along said seismic trace which is located near said particular event, (b) setting up a search window around the picked input time, (c) locating a best sample and other samples within the search window, said best sample being a sample of the seismic trace which lies within the search window and which appears to represent the particular event, (d) setting up arrays to store the locations of said other samples which lie on the seismic trace and are disposed around both sides of the best sample, (e) using the samples stored in the arrays, plotting a curve which overlays the samples stored in the arrays, and (f) using the curve plotted during the plotting step (e), determining a time and amplitude associated with the particular event.

17. The method of claim 16, wherein the step (f), for determining the time and amplitude of the particular event in response to the curve plotted during the plotting step (e), further comprises the steps of:

(f1) locating the best sample on the curve, (f2) setting up a second window bounded on both sides of the best sample on the curve, where the second window has a first side and a second side, the width of that portion of the second window between the best sample on the curve and the first side being equal to 20% of a distance between the best sample and a first adjacent sample on one side of the best sample on the curve, the width of that portion of the second window between the best sample on the curve and the second side being equal to 20% of a distance between the best sample and a second adjacent sample on the other side of the best sample on the curve, (f3) determining an amplitude A1 of the curve at the first side, (f4) determining an amplitude A2 of the curve at the second side, (f5) determining if A2>A1 or if A1>A2, and (f6) performing a bisection and amplitude determination operation between the best sample on the curve and the second adjacent sample located adjacent the second side of the second window when A2>A1 and performing a bisection and amplitude determination operation between the best sample on the curve and the first adjacent sample located adjacent the first side of the second window when A1>A2.

18. The method of claim 17, wherein the performing step (f6), for performing a bisection and amplitude determination operation between the best sample on the curve and either the second adjacent sample or the first adjacent sample, comprises the steps of:

(f61) bisecting or subdividing, in half, the width between the best sample and the adjacent sample thereby producing a first midpoint line which lies midway between the best sample and the adjacent sample, performing an amplitude determination operation for determining the amplitude of the curve at the best sample and the amplitude of the curve at the adjacent sample, and comparing the amplitude of the curve at the best sample with the amplitude of the curve at the adjacent sample, (f62) when determining a peak type of event, when the amplitude of the curve at the best sample is greater than the amplitude of the curve at the adjacent sample, bisecting or subdividing, in half, the width of another window between the first midpoint line and the best sample thereby producing a second midpoint line which lies midway between the first midpoint line and the best sample, performing an amplitude determination operation for determining the amplitude of the curve at the first midpoint line and the amplitude of the curve at the best sample, and comparing the amplitude of the curve at the first midpoint line with the amplitude of the curve at the best sample, (f63) continuing the bisecting step and the performing step and the comparing step until the amplitude of the curve at an nth midpoint line and the amplitude of the curve at another (n−1)th midpoint line differs by only a very small tolerance value, and (f64) when the difference between the amplitude of the curve at the nth midpoint line and the amplitude of the curve at the (n−1)th midpoint line is within the tolerance value, the location of the particular event on the particular seismic trace corresponds to the time and amplitude of the nth midpoint line.

19. In seismic exploration where reflected seismic energy is recorded as a function of time to produce a seismic record and where in a computer is used that is adapted to process such seismic record with respect to the location of the peak associated with a horizon, an article of manufacture comprising a medium that is readable by a computer and that carries instructions for said computer to perform a process comprising the steps of:

(a) locating a sample from the seismic record that best defines the event and event type desired within a given window of samples, (b) selecting a portion of the seismic record for the bisection and approximation of the location and amplitude of the desired event, (c) performing bisection between samples in the selected portions of the seismic record, and (d) determining an approximate amplitude and location of the event at an input location for snapping a horizon without bias with respect to sample location.

20. Apparatus for accurately locating a particular event of a plurality of events in a particular seismic trace among a plurality of seismic traces, comprising:

a first locating apparatus adapted for locating a best sample of said particular seismic trace that lies within a search window, the best sample most accurately representing said particular event within said search window;

a second locating apparatus adapted for locating other samples around the best sample in said search window including a first adjacent sample on one side of the best sample and a second adjacent sample on the other side of the best sample;

selection apparatus adapted for selecting either said first adjacent sample or said second adjacent sample; and a bisection and amplitude determination apparatus adapted for performing a bisection operation and an amplitude determination operation between the best sample and the adjacent sample selected by the selection apparatus to thereby determine and locate said particular event of said plurality of events in said particular seismic trace among said plurality of seismic traces.

21. The apparatus of claim 20, wherein said selection apparatus comprises:

a first line determination apparatus adapted for determining a first line between said best sample and said first adjacent sample and determining a first amplitude of said first line;

a second line determination apparatus adapted for determining a second line between said best sample and said second adjacent sample and determining a second amplitude of said second line;

comparison apparatus adapted for comparing said first amplitude with said second amplitude and determining if said first amplitude is greater than said second amplitude; and further selection apparatus adapted for selecting either said first adjacent sample or said second adjacent sample in response to the comparing and the determining performed by said comparison apparatus.

22. The apparatus of claim 21, wherein said bisection and amplitude determination apparatus comprises:

a second selection apparatus adapted for selecting a first midpoint between the best sample and the adjacent sample;

comparison apparatus adapted for comparing a first amplitude of said best sample with a second amplitude of said adjacent sample and selecting one of said best sample or said adjacent sample in response to said comparing when a difference between said first amplitude and said second amplitude is greater than a tolerance value;

a third selection apparatus adapted for selecting a second midpoint between the first midpoint and said one of said best sample or said adjacent sample selected by said comparison apparatus; and a second comparison apparatus adapted for comparing a third amplitude of said first midpoint with a fourth amplitude of said one of said best sample or said adjacent sample and selecting one of said first midpoint or said one of said best sample or said adjacent sample when a difference between said third amplitude and said fourth amplitude is greater than said tolerance value.

23. The apparatus of claim 22, wherein said bisection and amplitude determination apparatus further comprises:

means for repeating the selection of a third midpoint and, using said second midpoint, repeating the comparing and the selecting performed by said second comparison apparatus for selecting either said second midpoint or said one of said first midpoint or said one of said best sample or said adjacent sample when a difference between a fifth amplitude of said second midpoint and a sixth amplitude of said one of said first midpoint or said one of said best sample or said adjacent sample is greater than said tolerance value.

24. The apparatus of claim 22, wherein said bisection and amplitude determination apparatus further comprises:

a fourth selection apparatus adapted for selecting said first midpoint to represent said particular event when said difference between said third amplitude of said first midpoint and said fourth amplitude of said one of said best sample or said adjacent sample is less than or equal to said tolerance value.

* * * * *